United States Patent [19]

Curry

[11] Patent Number: 5,732,162
[45] Date of Patent: Mar. 24, 1998

[54] TWO DIMENSIONAL LINEARITY AND REGISTRATION ERROR CORRECTION IN A HYPERACUITY PRINTER

[75] Inventor: Douglas N. Curry, Menlo Park, Calif.

[73] Assignee: Xerox Corporation, Stamford, Conn.

[21] Appl. No.: 145,013

[22] Filed: Oct. 28, 1993

[51] Int. Cl.[6] ................................................. G06K 9/32
[52] U.S. Cl. .......................... 382/294; 358/428; 382/300
[58] Field of Search ....................................... 382/112, 294, 382/299, 254, 258, 267, 300; 358/448, 455, 456, 261.4, 262.1, 428, 462, 464, 467

[56] References Cited

U.S. PATENT DOCUMENTS

| | | | |
|---|---|---|---|
| 4,080,634 | 3/1978 | Schreiber | 358/298 |
| 4,381,547 | 4/1983 | Ejiri | 382/47 |
| 4,622,593 | 11/1986 | Curry | 358/284 |
| 4,639,789 | 1/1987 | Curry | 358/285 |
| 4,644,582 | 2/1987 | Morishita et al. | 382/294 |
| 4,654,876 | 3/1987 | Atkins | 382/294 |
| 4,766,560 | 8/1988 | Curry et al. | 364/721 |
| 4,860,237 | 8/1989 | Curry | 364/718 |
| 4,893,136 | 1/1990 | Curry | 346/108 |
| 4,935,891 | 6/1990 | Curry | 364/721 |
| 5,048,102 | 9/1991 | Tararine et al. | 382/300 |
| 5,103,490 | 4/1992 | McMillin | 382/318 |
| 5,125,042 | 6/1992 | Kerr et al. | 382/300 |
| 5,138,339 | 8/1992 | Curry et al. | 346/108 |
| 5,140,648 | 8/1992 | Hackett et al. | 382/299 |
| 5,181,257 | 1/1993 | Steiner et al. | 382/294 |
| 5,216,443 | 6/1993 | Thornton et al. | 346/108 |
| 5,229,760 | 7/1993 | Curry | 340/744 |
| 5,233,367 | 8/1993 | Curry | 346/108 |
| 5,251,271 | 10/1993 | Fling | 382/294 |
| 5,374,997 | 12/1994 | Eschbach | 358/448 |
| 5,469,274 | 11/1995 | Iwasaki et al. | 382/294 |

FOREIGN PATENT DOCUMENTS

| | | |
|---|---|---|
| 0342640A3 | 5/1989 | European Pat. Off. . |
| 0411954A3 | 8/1990 | European Pat. Off. . |
| 0411954A2 | 2/1991 | European Pat. Off. . |

*Primary Examiner*—Joseph Mancuso

[57] ABSTRACT

A system for correcting registration errors in a printer. The system includes a memory device for storing sequential rasters of image data and an interpolator coupled to the memory device, the interpolator using the rasters of image data from the memory device in conjunction with multiplication factors to calculate an interpolated resample value. The system also includes addressing circuitry for providing address signals to the memory device, the addressing circuitry also providing the multiplication factors to the two dimensional interpolator. Finally, included is a correction device for providing adjustment values to the addressing circuitry, the adjustment values being used to correct for the registration errors.

3 Claims, 29 Drawing Sheets

Type I

Type II

Type IV

Type III

TWO DIMENSIONAL LINEARITY AND REGISTRATION ERROR CORRECTION IN A HYPERACUITY PRINTER

Cross reference is made to the following co-pending, commonly assigned, U.S. Patent Applications, which were filed concurrently with this application, and are hereby incorporated by reference: U.S. application Ser. No. 08/AAA,AAA, titled "Interlace Formatting in a Hyperacuity Printer" (Atty. Docket No. 90470); Ser. No. 08/BBB,BBB, titled "Halftoning in a Hyperacuity Printer" (Atty. Docket No. 91301); Ser. No. 08/CCC,CCC, titled "Two Dimensional Linear Interpolation with Slope Output for a Hyperacuity Printer" (Atty. Docket No. 91302); Ser. No. 08/DDD,DDD, titled "Two Dimensional Slope Thresholding in a Hyperacuity Printer" (Atty. Docket No. 91303); and, Ser. No. 08/FFF,FFF, titled "Hyperacuity Printer Architecture" (Atty. Docket No. 93287Q).

BACKGROUND OF THE INVENTION

This invention relates to error correction, and more particularly, to two dimensional linearity and registration error correction in a hyperacuity printer.

Registration of images layers is becoming more important as multi-layer imaging is utilized for color printing. Mechanical means of registering layer information in the one to ten micron region is very costly due to extremely tight mechanical tolerances which must be achieved. Therefore, a need exists for a way to electronically correct for registration errors with subscan precision instead of holding extremely tight mechanical tolerances.

Up until now, for a polygon ROS imager, electronic registration correction has been only possible in the fastscan direction because of the continuous convolution of the data stream with the spot. Speeding up or slowing down the data clock to match the spot fastscan velocity has been shown in U.S. Pat. No. 4,766,560 to Curry et al. In the slowscan direction however, electronic registration correction with subscan precision has been impossible because the scan structure in the slowscan direction limited data transitions, or edges, to intervals of the scan pitch.

However, with the advent of using variable intensity on the photoreceptor such as pulse width modulation, limited subscan positioning precision has been made available for rendering images. In addition, with the advent of overscanned imaging, or hyperacuity printing, U.S. Pat. No. 5,138,339 to Curry et al., the gaussian spot used for printing is oversized and filters out the scan structure. Hence, the application of gray output data to the photoreceptor has a better intensity to edge placement response, and the image transitions in the slowscan direction can be corrected electronically as well to produce slowscan positioning compensation with better subscan pitch precision.

Therefore, together there is an opportunity to combine the fastscan compensation with the use of hyperacuity printing to achieve two dimensional image registration error correction with subscan precision. Furthermore, with the use of a resampling interpolator, precise resampled image data value can be calculated with fractional precision to aid in the correction. This two dimensional correction can correct errors from simple image phase shifting and variable resolution to very complicated non-linear stretching of the image data to match previous image layers or to compensate for mechanical irregularities in the system. Moreover, this technique should prove to be very cost effective as it is entirely electronic.

There has been work done on two dimensional electronic registration correction. Co-pending, commonly assigned, U.S. patent application Ser. No. 07/946693 titled "Apparatus and Method for Providing Accurate Layer Registration for Multiple layer Electronic Printing Systems," describes an apparatus and method for providing accurate layer registration for multiple layer electronic printing systems. The method comprises determination of-a time delay between page sync signal and start-of-scan signal, using this delay to determine delay dependent offset factor called the phase registration parameter, and correctively mapping image data to proper output channels based on the phase registration parameter and the laser number. The phase registration parameter must be determined at the beginning of each scan layer and the offset factors must be re-adjusted based on the new phase delay. However, this disclosure addresses only one type of registration error and cannot correct registration errors with subscan precision.

Also, co-pending, commonly assigned, U.S. patent application Ser. No. 07/998151 titled "Method and Apparatus for Eliminating Distortion via Overscanned Illumination for Optical Printers and the Like Having High Gamma Photosensitive Recording Media and High Addressability," discloses a method and apparatus for eliminating banding, misregistration and bowing by controlling a composite light intensity profile and phase shifting of a spatial location at which the composite light intensity profile crosses a xerographic threshold in a two dimensional high addressability printer operating in an overscan mode. The contrast, pitch grating and phase shifting are dependent on at least one of a predetermined amount of overlap, an exposure profile and an intensity value of each of the plurality of laser beam spots formed on the photosensitive medium of a two dimensional high addressability printer. However, this application uses a modulo counter, not an interpolator, to decide which pixels to use for a given correction. As will be seen, the use of a resampling interpolator, which delivers resampled image data with fractional precision is superior to the above method.

SUMMARY OF THE INVENTION

In accordance with the present invention, provided is a system for correcting registration errors in a printer. The system comprising: memory device for storing sequential rasters of image data; interpolator coupled to the memory device, the interpolator using the rasters of image data from the memory device in conjunction with multiplication factors to calculate an interpolated resample value; addressing circuitry for providing address signals to the memory device, the addressing circuitry also providing the multiplication factors to the two dimensional interpolator; and, correction device for providing adjustment values to the addressing circuitry, the adjustment values being used to correct for the registration errors.

DETAILED DESCRIPTION OF THE INVENTION

I. SYSTEM OVERVIEW 1.0 Typical ROS System

Figure 1:
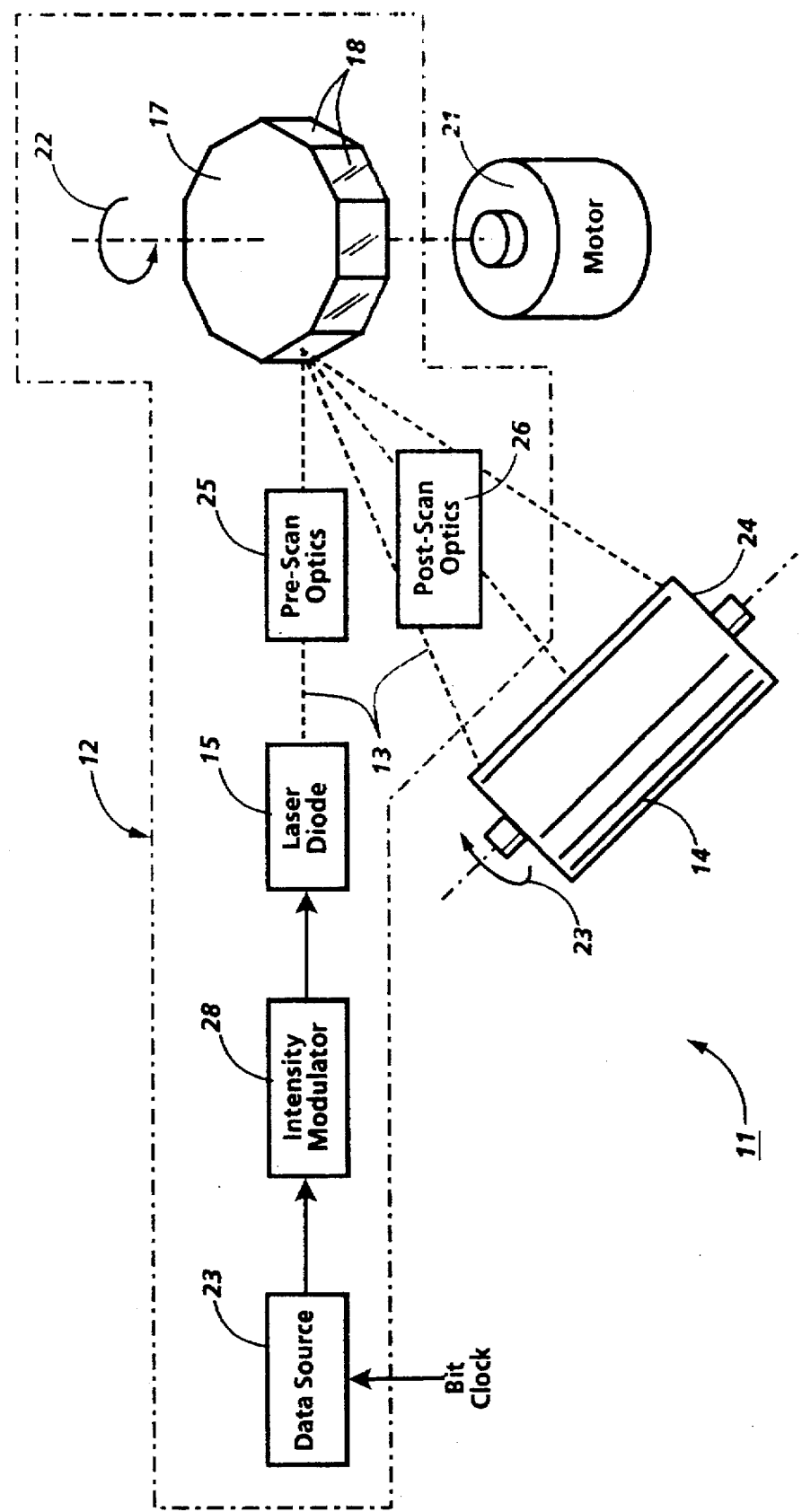
FIG. 1 is a simplified schematic diagram of a xerographic printer that is equipped to carry out the present invention.

Turning now to the drawings, and at this point especially to FIG. 1, there is a xerographic print engine 11 (shown only in relevant part) having a more or less conventionally configured flying spot ROS 12 for scanning a data modulated light beam 13 over a xerographic photoreceptor 14 in accordance with a predetermined raster scanning pattern. To that end, the ROS 12 comprises a laser diode 15 for emitting the light beam 13 in the visible or invisible (e.g., infra-red) band of the spectrum, together with a polygon scanner 17 that has a plurality of nearly identical, mirror-like exterior sidewalls or "facets" 18.

In keeping with standard practices, there is a motor 21 for rotating the scanner 17 about its central axis, as indicated by the arrow 22, at a substantially constant angular velocity. The scanner 17 is optically aligned between the laser 15 and the photoreceptor 14, so its rotation causes the laser beam 13 to be intercepted by and reflected from one after another of the scanner facets 18, with the result that the beam 13 is cyclically swept across the photoreceptor 14 in a fastscan direction. The photoreceptor 14, on the other hand, is advanced (by means not shown) simultaneously in an orthogonal, process direction at a substantially constant linear velocity, as indicated by the arrow 23, so the laser beam 13 scans the photoreceptor 14 in accordance with a raster scan pattern. As shown, the photoreceptor 14 is coated on a rotating drum 24, but it will be apparent that it also could be carried by a belt or any other suitable substrate.

Typically, the ROS 12 additionally includes pre-scan optics 25 and post-scan optics 26 for bringing the laser beam 13 to a generally circular focus proximate the photoreceptor 14 and for providing any optical correction that may be needed to compensate for scanner wobble and other optical irregularities. Preferably, the optical aperture of the ROS 12 is sufficiently large to avoid excessive truncation of the laser beam 13 because the beam 13 then comes to a generally circular or elliptical focus with a gaussian intensity profile. However, the broader aspects of this invention are not limited to any specific scan spot geometry or intensity profile. Accepted design principles indicate that the spatial frequency power spectrum of the scan spot profile should not have significant spatial frequency components outside the spatial frequency passband of the imaging system, but the scan spot can otherwise be tailored to satisfy a variety of system requirements.

To carry out the present invention, the amplitude, duty cycle, and/or pulse width of the laser beam 13 is serially modulated (collectively referred to herein as its "intensity modulation") by intensity modulator 28 in accordance with successive multi-bit digital data values. These data values are clocked out of a buffered data source 23 serially in response to data clock pulses which are time synchronized with the scan of the scan spot from bitmap location-to-bitmap location within the raster scan pattern. Thus, the data clock frequency can be selected (by means not shown) to map the data onto the raster scan pattern at any desired resolution, using either the same or different resolutions in the fastscan and the process directions. As will be appreciated, the data may be preprocessed (such as by means herein described) for the printing of halftoned images and/or text and other types of line art, so the data source 23 generically represents any suitable source of gray scale data for intensity modulating the laser beam 13.

As is known, the fastscan pixel positioning precision of the print engine 11 can be enhanced, if desired, by dynamically adjusting the frequency of the data clock to compensate for the pixel positioning errors that tend to be caused by "motor hunt" (i.e., variations in the angular velocity of the scanner 17), "polygon signature" characteristics (variations in the angular velocities at which the different facets 18 of the scanner 17 sweep the scan spot across the photoreceptor 14 from a start of scan position to an end of scan position), and "scan non-linearities" (i.e., localized variations in the linear velocity of the fastscan, which are caused by variances in the geometric relationship of the scanner 17 to spatially distinct segments of any given scanline). For more information on these sources of potential pixel positioning errors and the compensation that can be provided for those errors, the following commonly assigned United States Patents are hereby incorporated by reference: D. N. Curry U.S. Pat. No. 4,622,593 which issued Nov. 11, 1986 on "Polygon Signature Correction"; D. N. Curry U.S. Pat. No. 4,639,789 which issued Jan. 27, 1987 on "Raster Scanner Variable-Frequency Clock Circuit"; D. N. Curry et al. U.S. Pat. No. 4,766,560 which issued Aug. 23, 1988 on "Parallel/Pipelined Arithmetic Variable Clock Frequency Synthesizer"; D. N. Curry U.S. Pat. No. 4,860,237 which issued Aug. 22, 1989 on "Scan Linearity Correction"; D. N. Curry U.S. Pat. No. 4,893,136 which issued Jan. 9, 1990 on "Arithmetically Computed Motor Hunt Compensation for Flying Spot Scanners"; and D. N. Curry U.S. Pat. No. 4,935,891 which issued Jun. 19, 1990 on "Pseudo-Random Phase Shifted Arithmetic Bit Clock Generators for Digital Printers."

It is to be understood, however, that the increased pixel positioning precision of the existing compensation techniques listed above, strictly pertain to the spatial positioning of the pixel centers in the fastscan direction. Thus timing is used to adjust the fastscan pixel positions. This differs from the two dimensional "high addressability" or "microaddressability" utilized herein because microaddressability enables image transitions to be spatially positioned with subresolution precision in both the process direction and the fastscan direction. This feature sometimes is referred to as "two dimensional high addressability" or, in abbreviated form, as "2D high addressability" and is fully described in commonly assigned United States Patent U.S. Pat. No. 5,138,339 to D. N. Curry et al., which issued Aug. 11, 1992 on "Microaddressability Via Overscanned Illumination For Optical Printers And The Like Having High Gamma Photosensitive Recording Media." which is hereby incorporated by reference. Typically, intensity is used to adjust the pixel positions in the process direction.

In particular, according to U.S. Pat. No. 5,138,339 which can be utilized by the present invention, the pitch of the scan pattern for the printer 11 is selected to be significantly finer (i.e., smaller) than the FWHM (full width half max) diameter of the scan spot that is formed from the scan beam 13. This relatively fine pitch scan pattern causes the printer 11 to operate in an "overscanned" mode because the FWHM central core of the scan spot sweeps across spatially overlapping segments of the photoreceptor 14 during the scanning of spatially adjacent (i.e., neighboring) scanlines. Overscanning slightly degrades the spatial frequency response of the printer 11 in the process direction. However, it has been found that the linearity of the addressability response of ROS printers, such as the printer 11, increases rapidly as the ratio of the scan pitch to the FWHM diameter of the scan spot is reduced to progressively smaller, sub-unity values (i.e., increasing the overscan). In other words, it has been found that overscanning is the key to providing the essentially linear position control that enables discrete exposures to map image transitions onto a scan pattern at a subresolution precision. Thus, in the printer shown in FIG. 1, a relatively small loss of process direction frequency response is accepted to achieve substantially increased process direction addressability. The use of an overscan factor (i.e., the ratio of the FWHM diameter of the scan spot to the scan pitch) in excess of about 2× only marginally improves the linearity of the addressability response of the printer 11, so designers contemplating the use of overscan factors greater than 2× or so should carefully analyze the overall performance of the system that is being designed to ensure that it is satisfactory.

The reason that it is important to adjust the pixel positions with subpixel or subscan precision in both the fastscan and process directions is because of the ability of the human visual system to perceive edge placement precision from 10 to 60 times more precisely than the acuity (resolution) of the visual system. This ability of the human visual system is referred to as hyperacuity. Thus, the resolving power of the printer need extend just beyond the visual system's acuity cutoff of around 300 to 400 lines per inch at a twelve inch view distance, the hyperacuity response of the printer needs to be able to position the edges of these relatively coarse marks with a precision of from 3,000 to 20,000 positions per inch. It is not practical to implement high speed printers with resolutions of 3,000 to 20,000 pixels per inch, so the alternative is to make a scanner with similar characteristics as the human visual system: its hyperacuity response is an order of magnitude or more greater than its own resolution. The linearity provided by overscanning enables this performance.

It then becomes necessary to provide this scanner with enough fidelity information to drive it. Bitmaps, which are usually used, are a poor source, because they do not efficiently store hyperacuity information. The information is best provided by gray source data, which can have a limited resolution of 300 to 400 samples per inch, for instance, and a gray depth of perhaps 8 bits, which is logarithmically encoded to achieve 256 levels, which provides the hyperacuity information. This data can be converted in real time with the electronics herein described to produce the high bandwidth gray data destined for the photoreceptor or media. Thus, this information, which amounts to the equivalent of over 23 million bits per square inch (at 4800×4800 addressability units per inch, for instance), is used only on the photoreceptor or media, not stored in an expensive page buffer.

2.0 Hyperacuity Printer Architecture

Figure 2:
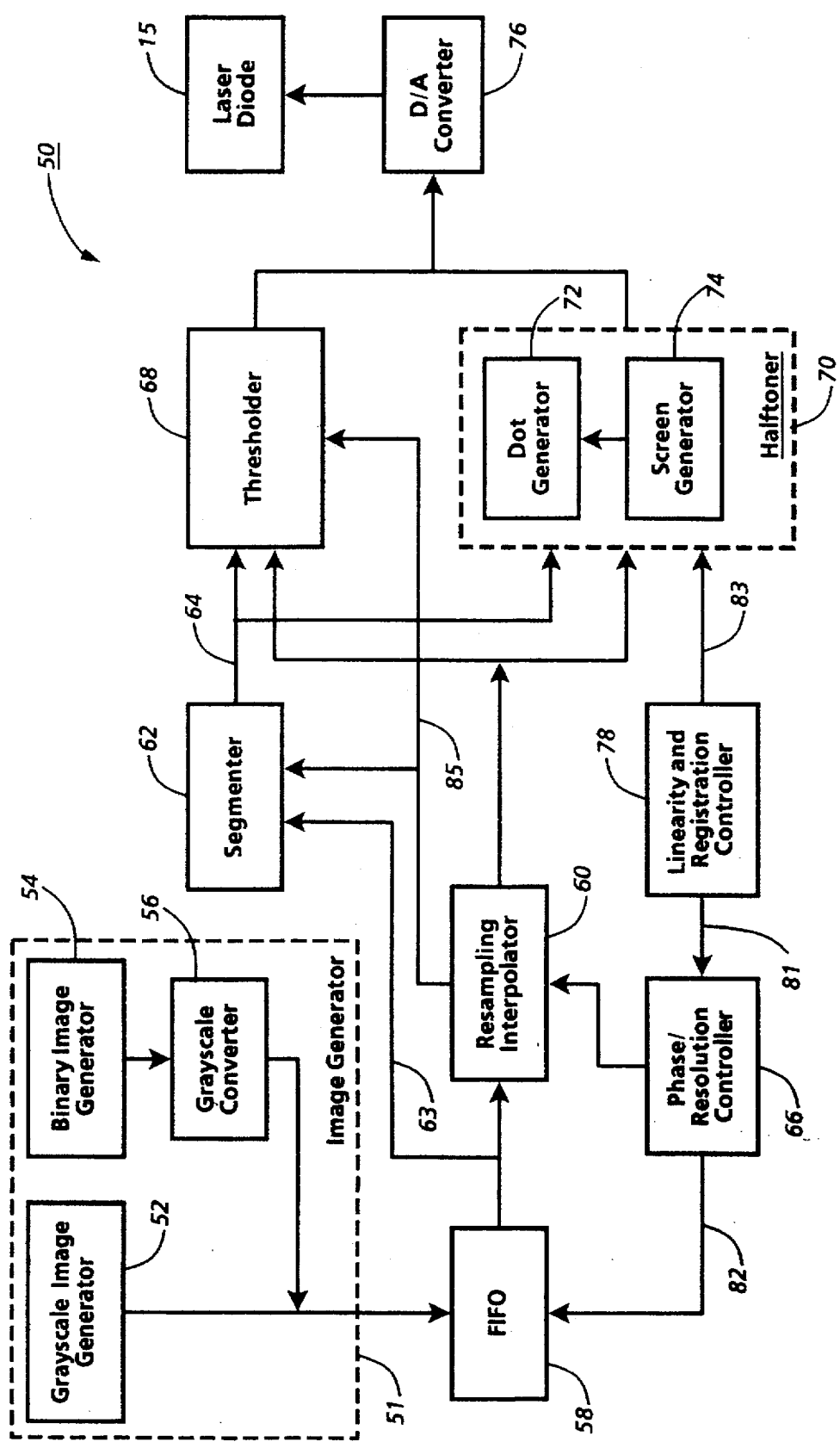
FIG. 2 is a block diagram of a single channel hyperacuity imager subsystem according to the present invention.

High quality printing not only depends on machine noise and exposure quality, but on how much fidelity information can be passed on to the printer from the data source. It is the purpose of the electronics in the printer to convert high fidelity, sampled representation into a high bandwidth, high resolution bit stream for delivery to the photoreceptor. FIG. 2 shows a block diagram of the subsystem components in a hyperacuity printing system, referred to herein as printer 50, in accordance with the present invention. Printer 50 can be implemented like the xerographic print engine 11 of FIG. 1, however, it is not intended to be limited to such a print engine configuration.

Printer 50 includes data sources from Image Generator 51 including Grayscale Image Generator 52, Binary Image Generator 54, and Grayscale Converter 56. Further included are FIFO (First In First Out) memory 58, Resampling Interpolator 60, segmenter 62, Phase/Resolution Controller 66, halftoner 70, D to A converter 76, laser diode 15, and Linearity and Registration Controller 78. The resampling interpolator 60, halftoner 70, thresholder 68 and digital to analog converter 76 are responsible for the conversion of the sampled representation into a high bandwidth, high resolution bitstream for delivery to the photoreceptor via laser diode 15.

Figure 3:
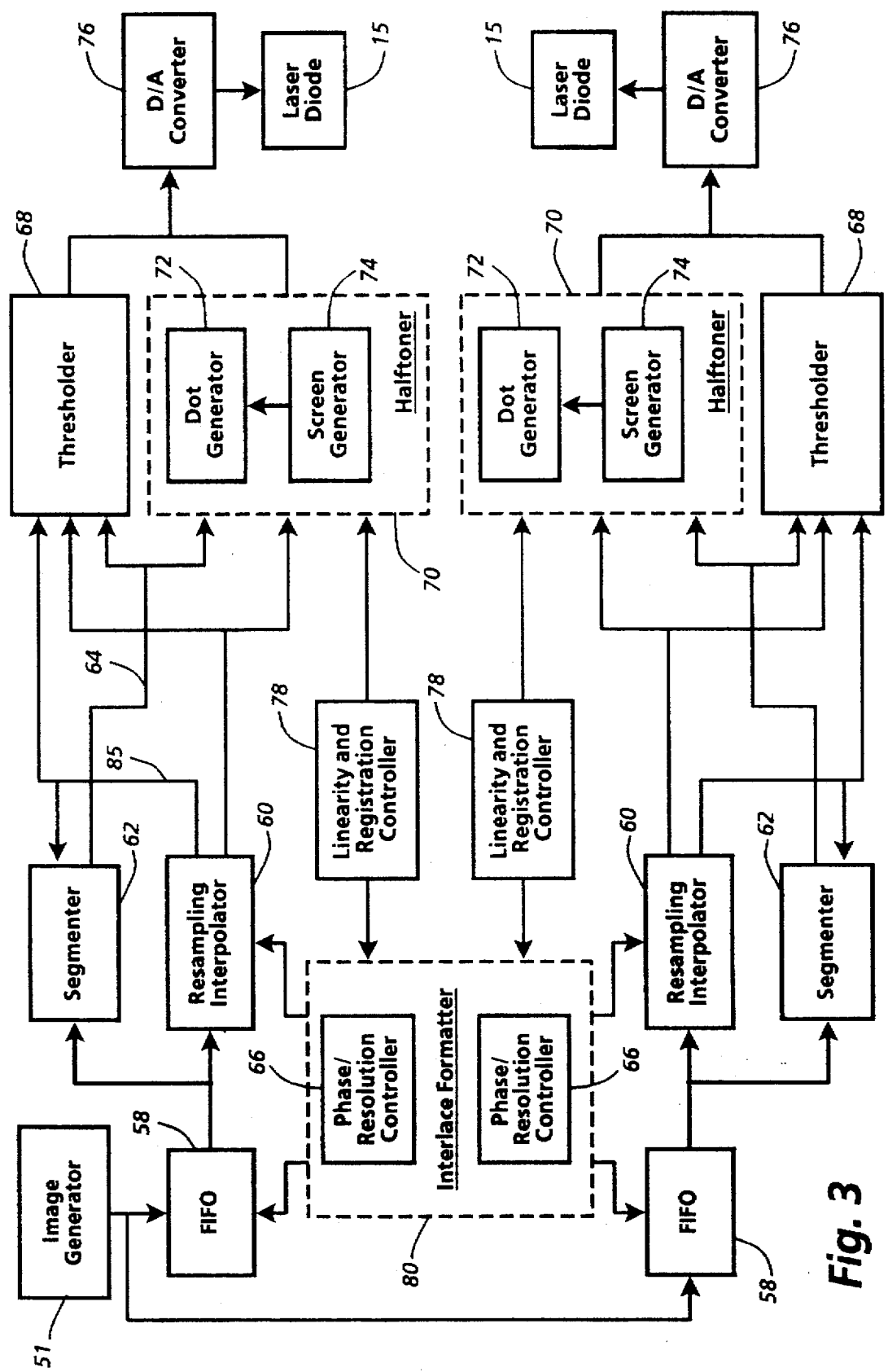
FIG. 3 is a diagram of a two channel hyperacuity imager subsystem according to the present invention.

FIG. 3 is a block diagram of a two channel hyperacuity printer whereby the printer has two laser diodes. Note that the system of FIG. 3 includes the same elements as the system shown in FIG. 2, with the addition of interlace formatter 80. Printer 50 will be generally described below, with detailed descriptions of each subsystem component following the general description.

The image generator used in the printing system can be binary or gray, and is not restricted to a specific resolution or gray (multi-bit) depth. In general, gray depth over an image can be variable to accommodate a physical interface with the imager subsystem or to adjust the fidelity of image information sent to the printer, while sample density (the number of samples per inch) will be adjustable up to some maximum to match the resolution goal of the imager. As shown in FIG. 2, image data may be provided by grayscale image generator 52 which provides multiple bit per pixel data to FIFO 58. Or, image data may be provided in binary format, (i.e. one bit per pixel), by binary image generator 54. This binary data from generator 54 can then be converted to grayscale by grayscale convertor 56 before processing. A typical operation performed by the grayscale convertor 56 is convolution or filtering, then scaling of a high resolution binary image into a coarser gray image. However, the edge information present in the binary image is encoded naturally by the convolution or filtering operation into gray depth. An exemplary description of a grayscale convertor can be found in co-pending, commonly assigned, U.S. patent application Ser. No. 07/937,631, filed Aug. 28, 1992, titled "Enhanced Fidelity Reproduction of Images With Device Independent Numerical Sample Output," and is hereby incorporated by reference.

The image generator 51 also can download (in advance of printing) halftoning and thresholding information tuned to the special characteristics of the imager and the desired imaging response. This download file is not image data, but rather the contents of the look-up table used for halftoning or thresholding. For example, software in the image generator could determine the level to erode or dilate a specified font for the target write black or write white platform, and produce an appropriate download file.

FIFO 58 provides buffering which allows data to be delayed for use in multi diode configurations and delayed for accessing two adjacent scans for interpolation. As will be seen, in a multi-diode configuration, the diodes are positioned along the process direction with some beam spacing distance. Because of this, at any moment during printing, one diode will be accessing data from a different portion of memory in the process direction than another diode. Control of the FIFO buffers in a multi-channel configuration, such as that of FIG. 3, is the responsibility of interlace formatter 80 in cooperation with phase/resolution controller 66. Since the image information is sent only once from the image generator in the form of serial rasters, the FIFO buffers the number of rasters spanned by the laser diodes in the process direction. Furthermore, FIFO 58 provides delayed raster information for use with other image processing functions. In this case, these delayed rasters are used by resampling interpolator 60 in pairs.

The existence of resampling interpolator 60 in the electronic pathway between the image generators and the output allows a unique opportunity to electronically map data spatial position into arbitrary misalignment of the imager and its mechanical process as well as the customary use which provides resolution conversion. The information required to conformally map the data into the imperfections of the engine and laser scanner are obtained from the linearity and registration controller 78, and processed through phase/resolution controller 66, and can be viewed as a dynamic resolution control. Any imperfection in the platform which can be measured accurately can be servoed electronically for conformal electronic registration.

Resampling interpolator 60 executes a standard image processing function of interpolation, which can be linear interpolation for processing simplicity. For the hyperacuity printer 50, the spot on the photoreceptor is tracked by appropriate electronics, taking into account electronic registration requirements. Without electronic registration feedback, the phase/resolution controller 66 would start from zero and accumulate a constant value in both the fastscan and slowscan directions. With feedback, however, the start values or accumuland values are dynamically biased by adding in changing error values during printing. This information about the spot's current position is passed to resampling interpolator 60 which returns a sample intensity for that position, called a resample.

To obtain a resample, the spot's current position, measured in units of addressability in both x (fastscan) and y (slowscan or process) dimensions, is not necessarily coincident with one of the integer sample positions, but instead fractionally positioned among four of the nearest neighbors. The interpolator executes an algorithm which estimates what the sample intensity is at the current position by extrapolating the intensities of these four closest neighbors. The simplest form of this calculation assumes that the intensity varies in a straight line between adjacent samples, thus the term linear interpolation.

In addition, the resampling interpolator 60 will simultaneously calculate the local rate of change (slope) of the intensities and pass this information on to thresholder 68 as shown by line 85. This information can be used to predict where the exposure intensities of lineart will cross the xerographic threshold.

As mentioned above, the resampling interpolator is used for resolution conversion. Co-pending, commonly assigned, U.S. patent application Ser. No. 07/918,092, filed Jul. 24, 1992, titled "Resolution Conversion Via Intensity Controlled Overscanned Illumination for Optical Printers and the Like Having High Gamma Photosensitive Recording Media", which is hereby incorporated by reference, describes an alternative means and method of performing resolution conversion in the process direction in a hyperacuity printer, without the use of a resampling interpolator. Commonly assigned U.S. Pat. No. 5,229,760 titled, "Arithmetic Technique for Variable Resolution Printing in a ROS," and co-pending, commonly assigned U.S. Pat. No. 07/535, 629, filed Jun. 11, 1990, titled, "Continuously Tunable Raster Resolution Printing," also address resolution conversion in the process direction, but do not use an interpolator.

Thresholder 68 converts the resampled information from interpolator 60 into a gray data stream which drives the D to A converter when lineart, such as fonts and lines, is to be rendered. The hyperacuity printer 50 has the ability to position edges of image regions very precisely in the process and fastscan directions due to the use of timing and variable intensity as described above. The thresholder, however, attempts to render the sampled data by estimating where the sampled representation crosses the xerographic threshold. One form of hardware to accomplish the thresholding function is a cache memory acting as a look-up table. Another form of hardware to perform the thresholding function could be a processor or other suitable electronics to calculate the function in real time.

The thresholder 68 utilizes two dimensional slope information, line 85, generated by resampling interpolator 60, (which is generally thrown away in conventional interpolation schemes), and therefore is able to predict threshold crossings of the input file with subpixel precision. This is important because it means that using bitmaps with ever increasing resolution (beyond the human visual systems' acuity cutoff of around 300 to 400 pixels per inch at a 12 inch view distance, for instance) to position edges is no longer necessary.

In addition, this edge information can be used in conjunction with prior knowledge of the printer tone reproduction curve (TRC) and spot dimensions to compensate for the width of the spot, and thus achieve printer device independence for rendering an image on charge area development (write-black) printers or exposed area development (write-white) printers. This also makes the need to predistort fonts to compensate for printing on particular printers unnecessary.

Halftoner 70, including dot generator 72 and screen generator 74, converts the resampled information from resampling interpolator 60 into a binary map when pictorials are to be rendered. Pictorials require many levels of gray to be contour free, as well as a fine dot structure to make graininess imperceptible. A 4800 per inch addressability printer (1200 scans per inch and 4 levels of gray on photoreceptor, for instance) will have the ability to produce bitmaps with over a thousand levels of gray at 150 halftone dots per inch, for example (4800/150=32 addressability units per halftone cell side; 32×32=1024 possible levels). In addition, the tone reproduction curve can be embedded into the dot definition since only 256 levels (or less) need to be represented in the input data. In addition, the laser spot shape and size is compensated for. In order to accomplish this, a high fidelity representation of a halftone dot is required.

The definition for the halftone dot, as a function of spot position on the photoreceptor and the required gray level is stored in a memory. As the spot scans, the intensity of the spot will be adjusted by the D to A converter (or any other intensity modulation scheme such as pulse width modulation or duty cycle modulation, for instance) by the multi-bit (gray) output of the halftoner to define the boundaries of the halftone dots. For the case of a halftone dot with a pitch of 1/150 inch, 4800 addressability (4800/150=32 addressability units on each side of the halftone cell) and 256 different gray levels, the number of bits required in memory to define it is on the order of a million (32×32×256 memory locations×4 bits per memory location=1.05 million bits in the memory of the example.).

This halftoner differs with others of prior art in that intensity information (256 values) as well as screen position (32×32 values) are used as an address into the memory, and the multi-bit value output is directed to a gray modulator. Prior art halftoners retrieve a value based on the screen address only, compare it with the input intensity information (with a hardware comparator), and turn a laser either on or off depending on whether the value retrieved is above or below the input intensity.

In addition, halftoner 70 has very fine control over the halftone dot shape and size. For example, the halftoner will be able to produce dots with elliptical shape, or other optimized shapes to minimize dot gain in the mid tones or maximize impulse response in the highlight areas.

In order to properly render printed images, all display systems utilizing binary presentation, such as xerography and offset lithography, must be able to discern the difference between gray images (toneart or pictorials), and synthetic images (lineart, including text and lines). This is because binary printers must print gray images by halftoning. There is no ability to control a sufficient gradient of gray to produce continuous tone, as in photographs or thermal transfer printers. On the other hand, it is important from a visual point of view that high contrast lineart and text be printed with smooth edges. This is accomplished through segmentation via segmenter 62.

When printing the sampled representations, the samples will be passed through both halftoner 70 (for toneart) and thresholder 68 (for lineart) simultaneously. An additional bit, known as a segmentation bit or tag bit, line 63 from FIFO 58, is carried along with the multi-bit sample pixel and is delivered by the segmenter 62, after suitable time delay to the halftoner and thresholder. This bit will be used to switch between these two devices during printing, according to whether toneart from the halftoner or lineart from the thresholder is to be rendered. The resolution of information which determines this can be as high as one bit per sample, or some lower number. In order to control from where D to A converter 76 gets its input, segmenter 62 can either modify the input addresses to halftoner 70 and thresholder 68, or provide an enable signal to tri-state output devices on the outputs of halftoner 70 and thresholder 68. In any case, segmenter 62 provides a switching function between thresholder 68 and halftoner 70 via output 64.

Co-pending, commonly assigned, U.S. patent application Ser. No. 07/946,695, filed Sep. 18, 1992, titled "Edge Segmentation in a Two-Dimensional High Addressability Printer," also describes a segmentation implementation for use with a hyperacuity printer as described herein, and is hereby incorporated by reference. The segmenter of 07/946, 695 utilizes slope information 85 from resampling interpolator 60 in determining segmentation.

It can be appreciated that other segmentation algorithms known in the art, including real-time segmentation analysis, may be used to differentiate between pixels to be halftoned and pixels to be thresholded. In addition, more than two segmentation partitions may be utilized by adding new algorithm hardware in parallel, and switching among them with extra segmentation or tag bits.

Halftoner 70 and thresholder 68 provide several intensity levels at the frequency specified by the fastscan clock. The number of levels is determined by system design considerations, including tradeoffs between clock rate, number of channels, machine throughput, and xerographic noise. D to A converter 76 can use duty cycle, pulse width or current control to achieve the analog conversion for several light intensities.

Note that, because of the way in which levels are specified, the number of values required to encode the levels is always one more than number of levels. For instance, if four levels are specified, the required values for intensity would be 0%, 25%, 50%, 75%, 100%=5 values. It can be appreciated that more than four levels, such as 16 or 256, could be useful and easy to implement.

An important aspect of a hyperacuity printer is the incorporation of laser diode source 15. The laser diode 15 offers a bandwidth well into the GHz range, with the ability to modulate its intensity with electronic current control. In addition, laser diode may be produced in a monolithic, closely-spaced multi-beam configuration, allowing throughput and quality improvements. In the configuration shown in FIG. 3, a two laser diode system is illustrated. Commonly assigned U.S. Pat No. 5,216,443, titled "Programmable Intensity Smart Laser System Capable of Being Fabricated on a Semiconductive Substrate," which is hereby incorporated by reference, discusses embedding the digital to analog (D to A) conversion on the semiconductor substrate with the laser diode, the D to A conversion being controlled using pulse width modulation.

Another useful and unique feature available in printer 50 is that of linearity and registration control. For instance, color reproduction demands a greater precision in machine mechanical requirements for registration to achieve color layer to layer registration in the one to two mil range. It is extremely important that layer to layer registration be precise. With such precision, it can be possible to achieve process color for lines and text using this system. This precision is extremely difficult and expensive to achieve mechanically. Other requirements for registration in a multi station color machine can also be met, where each writing station would be calibrated to deliver a pixel map which overlaps precisely the pixel maps of the others. It is evident that, assuming the errors can be measured, that the two dimensional hyperacuity printer will be able to achieve these goals through electronic registration using linearity and registration controller 78. For example, at 4800 per inch addressability, the placement precision of edges is 0.2 mils.

Linearity and registration controller 78 does this by feeding back spot position error information to phase/resolution controller via line 81. Controller 78 also appropriately displaced samples to the decomposer electronics (halftoner 70) via line 83. In addition, x-y position registration, scan linearity correction, velocity servoing and photoreceptor skew and runout correction can be performed electronically while relaxing the specifications on the optomechanical components.

Turning now to FIG. 4 through FIG. 39, each subsystem n printer 50 will be described in detail.

1.0 FIFO

Figure 4:
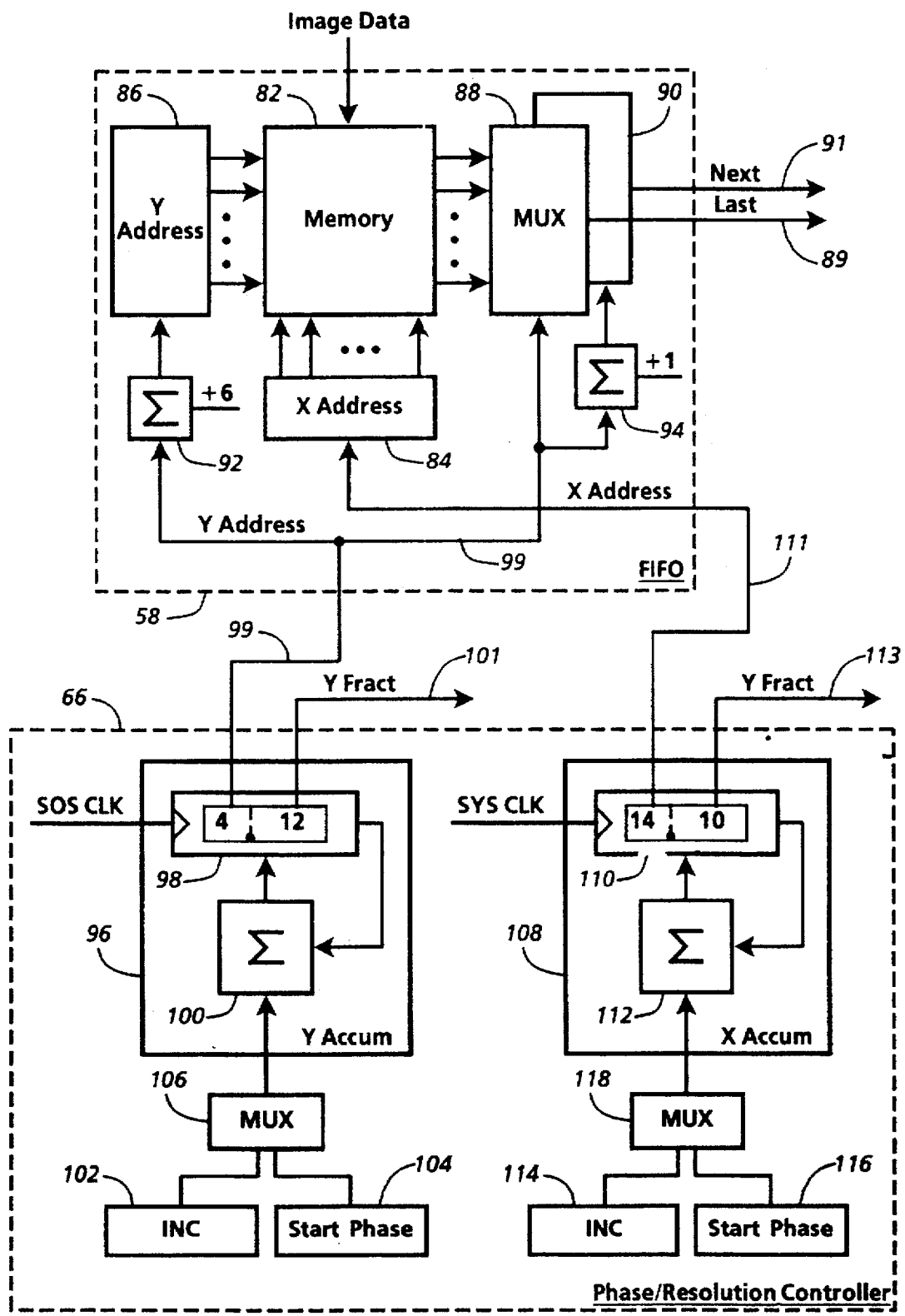
FIG. 4 is a block diagram depicting the elements included in the FIFO and phase/resolution controller shown in FIGS. 2 and 3.

FIG. 4 is a detailed block diagram of the elements included in FIFO 58 and phase/resolution controller 66. FIFO 58 is a memory device configured to be utilized as a two dimensional (2-D) window on the image data stored therein, having a fastscan (x) and a slowscan (y) dimension. Phase/resolution controller 66 as well as interlace formatter 80 will assist in providing addresses into that 2-D window FIFO 58 has memory 82 in which a number of rasters, or scanlines are stored. Each raster has a plurality of pixels, and each pixel has one to eight bits. The width of memory 82 is at least large enough to store an entire raster of pixels. In addition, the width includes capacity for the segmentation or tag bit or bits, as necessary. Segmentation or tag bits are delivered to the segmenter through line 63, and are stored with the pixel in the FIFO to insure correct time delay in application of the halftoning or thresholding algorithms. The height of memory 82 is at least large enough to compensate for the beam spacing in a multi-channel system, plus accommodation for one raster to be used by resampling interpolator 60, and plus one or two rasters to enable the reading of one raster while writing another. Typically four to eight rasters are stored, but the invention is not limited by such.

FIFO 58 is configured such that it is a three port memory having one write port and two read ports. As memory 82 is being addressed, simultaneously the image generator loads the raster being generated into the FIFO as two rasters are being read out for processing. As will become apparent, the x address for all three ports are the same while the effective y address for each port is different by a given offset. Furthermore, for a given x address, the pixel stored at that address for each raster stored in memory 82 is available.

Memory 82 is addressed in the x direction by XADDR demultiplexor 84 (demux). Phase/resolution controller 66 supplies a fourteen bit number via XADDRESS line 111 to demux 84 thereby allowing demux 84 to address $2^{14}$ pixels along a raster stored in memory 82. Phase/resolution controller 66 supplies a four bit number via YADDRESS line 99 creating $2^4$ addresses. In the y direction there need to be offsets in the addressing in order to accommodate simultaneous reading and writing of memory 82. In order to create the necessary offsets for y direction addressing, full adder 92 adds a fixed value to YADDRESS 99 which in turn is used by YADDR demux 86 for write port addressing. In a similar manner, full adder 94 supplies a fixed offset to one of the two read ports. Since all rasters stored in memory 82 are available simultaneously, mux 88 and mux 90 are used to select two of the rasters for processing at any one time. It is the use of these two muxes that creates the two read ports. Data from mux 88 is shown as line LAST 89 while data through mux 90 is shown as NEXT line 91. The use of the LAST and NEXT rasters will become apparent when discussing the resampling interpolator. Note that the addresses do not advance by more than one at a time, thus the FIFO-like nature of this memory subsystem.

2.0 Phase/Resolution Controller

One purpose of phase/resolution controller 66 is to provide addressing to FIFO 58 as described above. Another purpose of phase resolution controller 66 is to provide a fractional accumulated number for use by resampling interpolator 60.

Phase/resolution controller 66 has a y accumulator 96 and an x accumulator 108. Y accumulator 96 includes register 98 and full adder 100. Register 98 is a sixteen bit register whereby the leftmost four bits represent the integer portion and the remaining twelve bits represent the fractional portion of the sixteen bit number. The integer portion is used as the YADDRESS line 99 while the fractional portion is multiplication factor line YFRACT 101. As will be seen, YFRACT 101 will be used by resampling interpolator 60.

Phase/resolution controller 66 also has X accumulator 108. X accumulator 108 includes register 110 and a full adder 112. Register 110 is a twenty-four bit register whereby the leftmost fourteen bits represent the integer portion and the remaining ten bits represent the fractional portion of the twenty-four bit number. The integer portion is used as the XADDRESS line 111 while the fractional portion is multiplication factor line XFRACT 113. As will be seen, XFRACT 113 will also be used by resampling interpolator 60.

Each accumulator has associated with it a loadable INC register and a loadable START PHASE register. During each clock cycle controlling the accumulators, the accumulators can only increment by the number loaded in the INC registers. The value loaded in the INC registers is fractional, therefore the accumulation is fractional. As will be understood from the discussion of the resampling interpolator, the fractional increment enables the calculation of pixels values between two pixels and/or two rasters stored in the FIFO. Once the accumulators have accumulated the fractional value whereby it rolls over into the integer value, the address into the FIFO is at the next address position, or pointing to the next pixel or raster of data. In the system described herein, in order to satisfy Nyquist criteria, it may be desirable to have at least two clock cycles before changing to the next address, therefore the INC values may be restricted to less than or equal to 0.5.

For x accumulator 108, the value in INC register 114 is equal to the number of samples per inch in the fastscan direction, divided by the number of fastscan clocks per inch. For instance, at 600 samples per inch, and 4800 fast scan clocks per inch, INC=0.125. The value in START PHASE register 116 equals zero, (unless a registration correction value has been provided by the linearity and registration controller 78, which will be discussed later). The process for determining the values in the INC register 102 and START PHASE register 104 for y accumulator 96 will be explained in more detail with reference to the interlace formatter.

At the beginning of a page, register 98 of y accumulator 96 is loaded with a START PHASE value from register 104. With each start of scan clock signal, SOSCLK, y accumulator 96 is incremented by the value stored in INC register 102. Since the number being accumulated is fractional, the integer part of the number in register 98 will not be incremented by more than one at a time. In this example, registers 102, 104 are each thirteen bits.

At the beginning of a scan, register 110 of x accumulator 108 is loaded with START PHASE value from register 116. With each system clock signal, SYSCLK, x accumulator 108 is incremented by the value stored in INC register 114. Since the number being accumulated is fractional, the integer part of the number in register 110 will not be incremented by more than one at a time. In this example, registers 114, 116 are each eleven bits.

In general, the x and y address for the FIFO are tracked by the x accumulator for the fastscan direction and with the y accumulator for the slowscan direction. Therefore, the integer portions of the accumulators should never advance by more than one since the system is systematically clocking through the memory in a FIFO-like fashion.

3.0 Interlace Formatter

Figure 5:
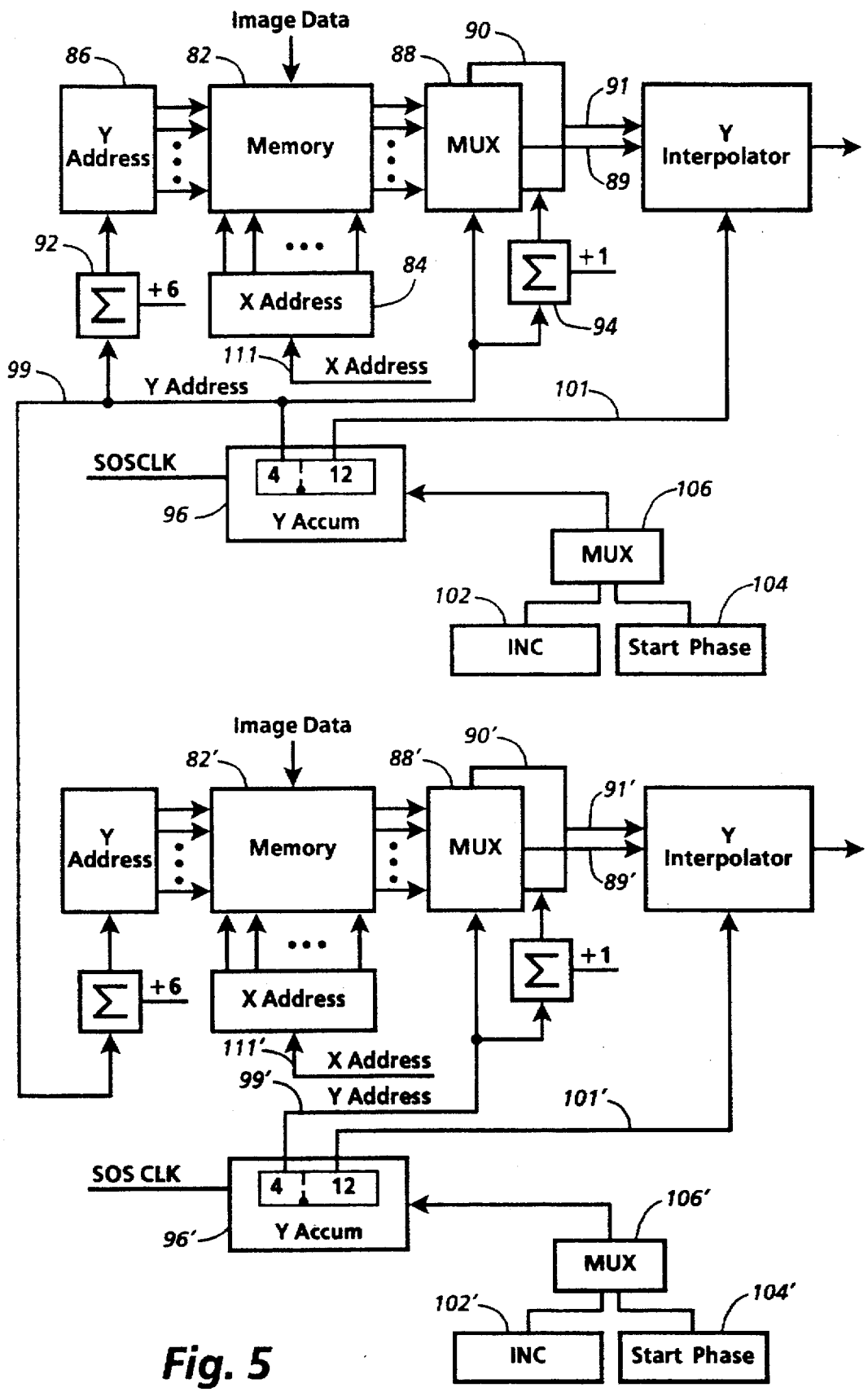
FIG. 5 is a block diagram depicting the elements included in the gray interlace formatter shown in FIG. 3.

The phase/resolution controller along with the interlace formatter facilitate resolution conversion, registration correction, and interlacing. Referring to FIG. 5, the interlace formatter is basically a duplication of the y components in the phase/resolution controller with an offset to allow each channel to access the FIFO raster data at a point in the data which matches the channel's beam position in the two channel system of this example. The offset loaded into the START PHASE registers, accounts for the beam spacing between photodiodes. As shown, there is a connection (line 99) between the channels, which maintain the write address for both channels, thus causing the write address for both channels to be the same. Since the write address is the same, the same data is being written into the memory of each channel simultaneously. However, due to the values in the START PHASE registers, the read address is staggered to compensate for the distance between the two photodiodes. Therefore, the the image generator only needs to write one raster at a time into memory before printing, thereby decreasing its complexity over prior systems which required the image generator to supply different data to each channel simultaneously. The interlace formatter facilitates accessing data in the memory in two places simultaneously, thus creating interlacing automatically. The interlace formatter described herein has the the ability to map any interlace factor into any set of rasters that are in the memory.

Commonly assigned, U.S. Pat. No. 5,233,367 titled "Multiple Beam Interlace Scanning System," which is hereby incorporated by reference, describes an image forming apparatus and method for interlace scanning plural light beams by deflecting the plural beams with a rotating polygon onto a recording medium wherein the spacing between adjacent beams hold the relation $$\frac{I}{Q} = \frac{Bwf}{V_o}$$

wherein I is an interlace factor equal to the number of reference scans between adjacent beams from a single facet of the polygon on the photoreceptor. The photoreceptor velocity is $V_o$, $\omega$ is the polygon angular velocity, f is a number of facets per revolution of the polygon, Q is the number of beams and B is the beam spacing. As will be shown, the interlace formatter described herein implements a hardware configuration which utilizes the above equation to facilitate interlacing by mapping rasters into the polygon scan structure of the system.

Generally, for interlace scanning, any positive value for the interlace factor I may be selected. By selecting various values for the interlace factor I and the number of beams Q, it is possible to obtain equally spaced, fractional or multiple interlace scanning.

For equally spaced, non-overlapped interlace scanning, I must be selected as a positive integer and itself and Q must not have any common integer divisors greater than 1. For equally spaced, non-overlapped, interlace scanning, the interlace factor is the distance between adjacent scans laid down by a single facet of the polygon divided by the distance between adjacent, interlaced scans. Between any two adjacent scans laid down by a single facet of the polygon are interlaced additional scans laid down by prior or subsequent facets of the polygon.

In a dual channel interlace formatter shown in FIG. 5, there is a master channel (channel 0) and a slave channel (channel 1). For clarity, the device numbers in the slave channel are indicated with a prime notation. The values for START PHASE registers can be calculated by the equation START PHASE=(ch)(D)(B) where ch is the channel number, D is the target data density, or data resolution, in rasters per inch, on the photoreceptor and B is the beam spacing, in inches, between the photodiodes. B can be found from the equation above or can be measured. In FIG. 5, START PHASE register 104 is loaded with a zero, since it is in channel zero. START PHASE register 104' is loaded with (D)(B) since it is channel 1. This is the amount of offset into the memory required for interlacing.

The value in the INC registers 102, 102' represents how many rasters the photoreceptor moves per single facet. INC equals the density (rasters/inch) times $V_o/\omega f$ in inches/facet. In other words, INC represents how far it is necessary to go through the FIFO by a certain number of rasters. This number can be fractional.

Since INC can be fractional, y accumulators 96, 96' can request pixel values for a scan which falls between rasters. Therefore, y interpolators are used to interpolate the necessary data. A significant feature of this interlace formatter is in its ability to look into the FIFO, get the two rasters needed depending on where the scan is on the photoreceptor, and interpolate therebetween in order to get the correct data within a fraction of a raster precision.

4.0 Resampling Interpolator with slope output

Figure 6:
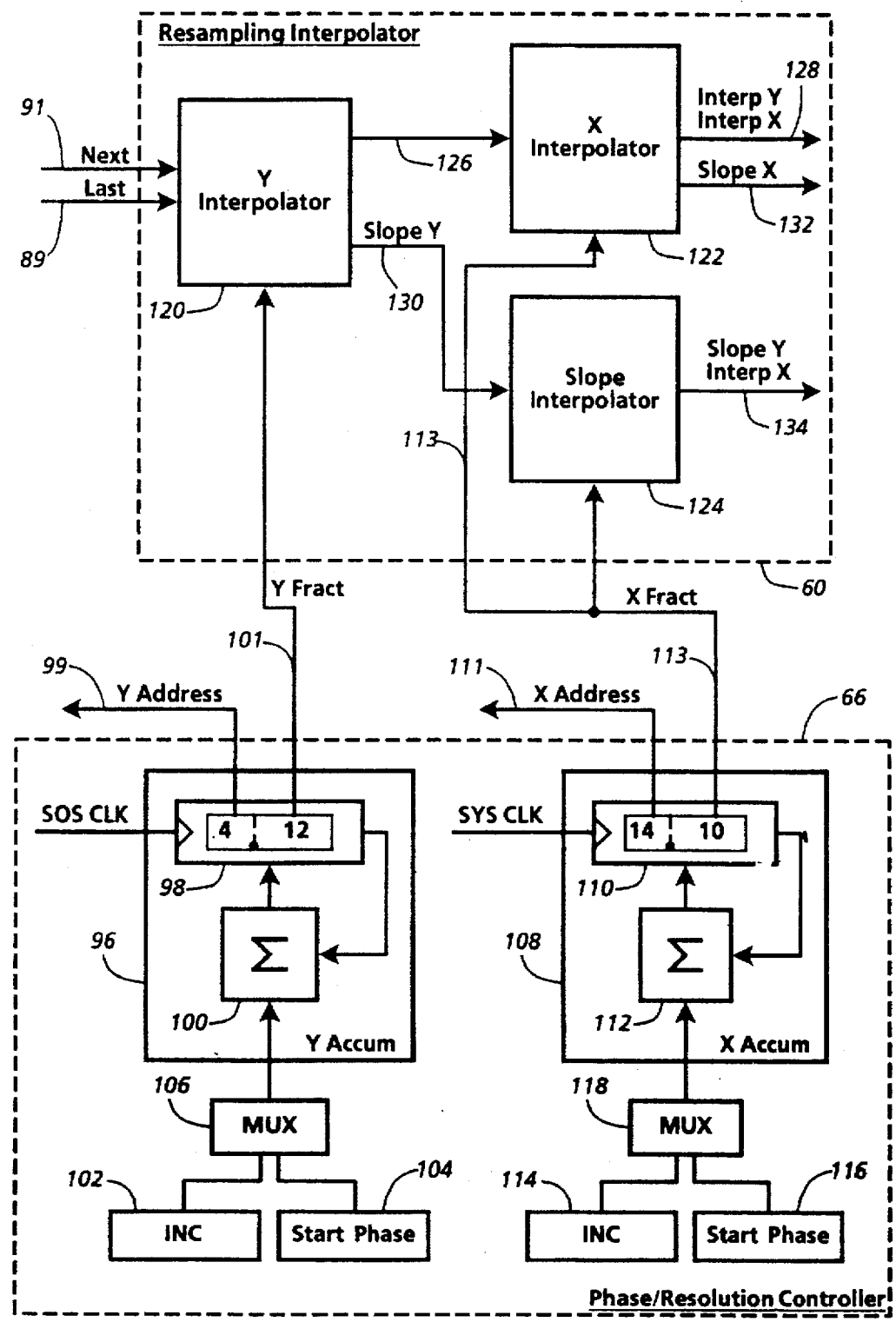
FIG. 6 is a block diagram depicting the elements included in the resampling interpolator and the phase/resolution controller shown in FIGS. 2 and 3.
Figure 7:
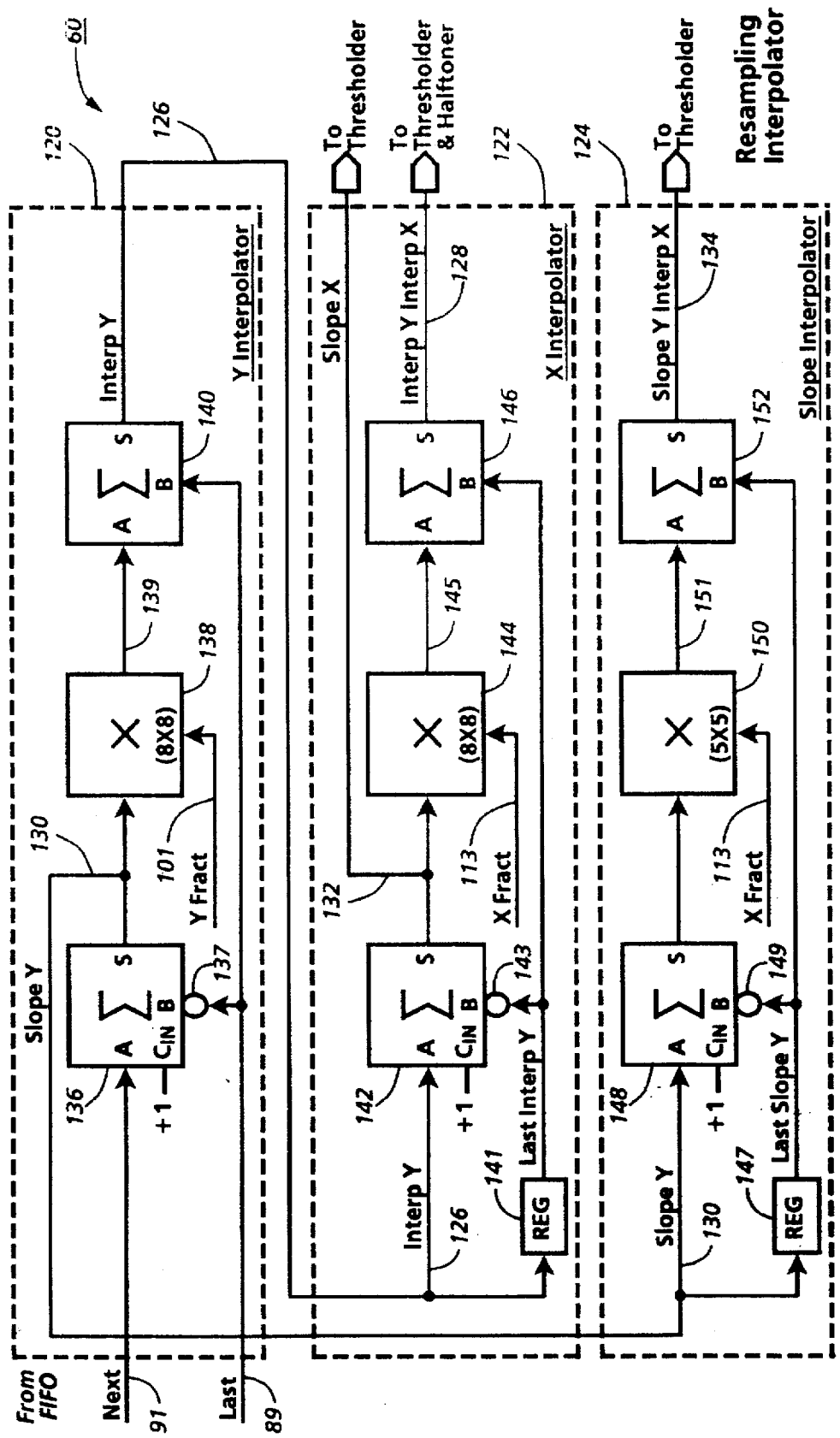
FIG. 7 is a block diagram depicting the elements included in the y interpolator, x interpolator and slope interpolator shown in FIG. 7.

FIG. 6 and FIG. 7 are detailed block diagrams of resampling interpolator 60 and associated circuitry. The outputs of the resampling interpolator are used for several image processing functions in the hyperacuity printer. First, sampled pictorial data can be reconstructed for use by the halftoner. Second, sampled text and lineart data can be reconstructed with an enhancement to the operation of the interpolator by retaining local slope information (rate of change of intensities), thereby enabling the prediction of where the sampled image will cross the xerographic threshold. The slope information will be used by the thresholder. Third, the interpolator may be used to resample the input data at different rates to achieve different resolutions, magnification and/or angular orientations of the input data. The resampling interpolator of this system is designed such that the target density or resolution can be written independent of the input resolution of the data in the memory. Finally, electronic registration, scan linearity correction, velocity servoing and photoreceptor skew correction can be performed in the printing system through suitable measurement and feedback of the errors in spot position. This information will be provided by the linearity and registration controller.

Referring to FIG. 6, resampling interpolator 60 receives two lines of adjacent raster data, appropriately labeled NEXT 91 and LAST 89, from the FIFO. The raster data is first processed by y interpolator 120 and then passed on to x interpolator 122 via data line 126. At the same time the raster data is being processed, slope information is being supplied by y interpolator 120 and x interpolator 122. Y slope information is processed by slope interpolator 124. Details of each interpolator will be discussed with reference to FIG. 8. As part of the processing of both the raster data and the slope data, y interpolator 120 uses the fractional part of the number, YFRACT 101, from y accumulator 96. In a similar manner, x interpolator 122 and slope interpolator 124 both use the fractional part of the number, XFRACT 113, form the x accumulator 108. The outputs of resampling interpolator 60 include interpolated raster data, INTERPYINTERPX 128, with associated slope information, SLOPEX 132 and interpolated slope data SLOPEYINTERPX 134.

Referring now to FIG. 7, shown are detailed block diagrams of y interpolator 120, x interpolator 122 and slope interpolator 124. Raster data from the FIFO in the form of NEXT line 91 and LAST line 89 are supplied to y interpolator 120. These two rasters represent adjacent raster from an image stored in the FIFO. As shown, raster LAST 89 is subtracted from raster NEXT 91 using full adder 136. Subtraction is accomplished through twos complement arithmetic whereby bubble 137, on the B input of adder 136, denotes an inverse function and a +1 on the $C_{IN}$ input adds the plus one necessary to carry out the twos complement function. The result of this subtraction is then multiplied by YFRACT 101 which is the fractional part of the number stored in y accumulator 96 (FIG. 6). Also as a result of this subtraction is the associated y slope information shown as SLOPEY line 130. Multiplier 138 performs an 8×8 multiplication in which the eight most significant bits of the result, line 139, are passed on to full adder 140. Full adder 140 adds the result of the multiply with raster LAST 89 to complete the y interpolation, with the result being line INTERPY 126. INTERPY 126 represents the y interpolated data.

X interpolator 122 receives its input from the output of y interpolator 120. Line INTERPY 126 becomes the A input to full adder 142. Also, line INTERPY 127 is delayed one pixel by register 141. The result of this delay, LAST INTERPY, is inverted by bubble 143 and then input into the B input of adder 143 with the carry input held high. Therefore, using twos complement arithmetic, LAST INTERPY is subtracted from INTERPY. The result of this subtraction produces associated x slope information SLOPEX 132. Also, the result of the subtraction becomes an input to multiplier 144. Multiplier 144 multiplies XFRACT 113, which is from the fractional part of the number in the x accumulator 108 (FIG. 6), by the output of adder 142. The most significant eight bits of the result of the multiplication is then added to LAST INTERPY by adder 146, resulting in interpolated data INTERPYINTERPX 128.

Slope interpolator 124 utilizes y slope information line SLOPEY 130 from y interpolator 120 as the A input into adder 148. SLOPEY 130 is delayed one pixel clock by register 147 becoming LAST SLOPEY. LAST SLOPEY is inverted via bubble 149 and thereby input into the B input of adder 148 with the carry input held high. The result is the subtraction of LAST SLOPEY from SLOPEY. The output of adder 148 is then multiplied by XFRACT 113 by multiplier 150. Multiplier 150 is a 5×5 bit multiplier, and the result is a five bit number being the five most significant bits resulting from the multiplication. In the final computation, the result of the multiplication, line 154, is added to LAST SLOPEY by adder 152 resulting in associated interpolated slope information denoted as SLOPEYINTERPX line 134.

In summary, y interpolator 120 implements the equation: YFRACT*(NEXT-LAST)+LAST=INTERPY. X interpolator 122 uses the output of y interpolator 120 and implements the equation of XFRACT*(INTERPY-LAST INTERPY)+ LAST INTERPY=INTERPYINTERPX. And finally, slope interpolator 124 implements the equation XFRACT* (SLOPEY-LAST SLOPEY)+LAST SLOPEY= SLOPEYINTERPX. Therefore, INTERPYINTERPX represents the interpolated value, SLOPEX represents the x slope of the interpolated value, and SLOPEYINTERPX represents the y slope of the interpolated value. (It should be noted that interpolation using the above equations is assumed to be linear as long as the value of YFRACT is not changing, or changing very slowly, with respect to XFRACT.)

5.0 Slope Thresholder

The purpose of the slope thresholder is to render lineart or text from a sampled representation by generating linear approximations of edges, or transitions, and converting these approximations into sequences of intensity levels for the output laser diode. As will be shown, the slope thresholder takes linear interpolated data and associated two dimensional slope information from the resampling interpolator and provides a thresholding function. The two dimensional slope information is used to determine where the edge that is being rendered is located and oriented relative to the laser spot's current position. All the possible slopes and intensity input permutations are calculated by rendering software in advance of printing. Once determined, the thresholding function will provide multi-bit intensity level data stored in the thresholder look up table to be used to drive the laser diode.

Figure 8:
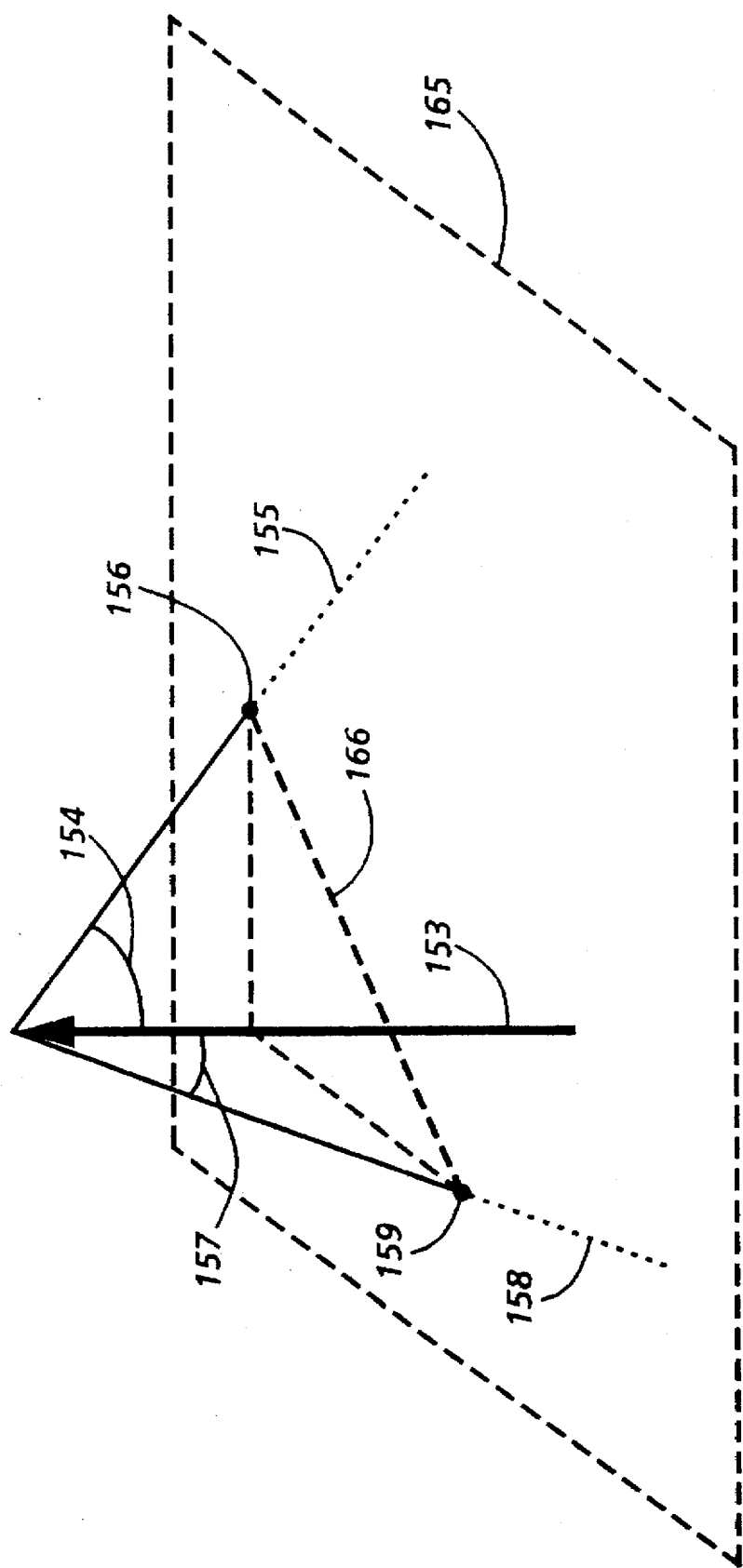
FIG. 8 is a diagram depicting the concept of slope thresholding in two dimensions.

FIG. 8 shows how the rendering software for the slope thresholder uses the intensity and slope information generated by the interpolator to position edges with high precision. The intensity 153, and the x slope and the y slope at the laser spot's current position is generated by the interpolator. The rendering software constructs an imaginary xerographic threshold as plane 165, positioned perpendicular to intensity 153, and having a nominal height of 50% of the maximum possible intensity of 153.

In the x (fast) direction, the rendering software generates an imaginary ray 155 from the top of intensity 153, at an angle 154 determined by the x slope. This imaginary ray 155 will intersect the nominal xerographic threshold 165 at point 156. In the y (slowscan) direction, the rendering software generates an imaginary ray 158 from the top of intensity 153, at an angle 157 determined by the y slope. This imaginary ray 158 will intersect the nominal xerographic threshold 165 at point 159. In this way, points 156 and 159 are generated, and determine a line 166 which is an estimate of the feature edge to be rendered at the spot's current position.

If the feature edge to be rendered is primarily perpendicular to the fastscan direction, timing is used to render the edge, and the rendering algorithm will utilize an on-to-off or off-to-on transition which has no intermediate gray values to achieve the steepest slope in exposure possible. The rendering algorithm must also take into account the fastscan width of the spot, the quantization of the fastscan clock, and other xerographic development transfer functions. If the feature edge to be rendered is primarily parallel with the fastscan direction, gray will be used to achieve subscan precision of the edge, and the appropriate gray value will be assigned to that memory location. The rendering algorithm must also take into account the slowscan width of the spot (which sets the linearity of the intensity to edge placement position), the number of levels being used, the scan pitch, and other xerographic development transfer functions.

It should be appreciated that the method utilized here to estimate the position of the edge to be rendered is linear, that is, straight lines were used in the explanation for simplicity. However, rendering software for downloading into the look-up table is processed in advance of printing, therefore, speed in doing the calculations is of lesser importance. Therefore, more complicated methods of precalculating the position of the edges are quite appropriate, and are recommended.

An example of the use of an equation to calculate the output of the thresholding function is:

$$C = \frac{(Sx^2 + Sy^2/F^2)^{1/2}}{(Sx^2 + Sy^2)} (V-T)$$

where C represents the intensity value of the drive on the photodiode, $S_x$ is the x slope, $S_y$ is the y slope, T is the xerographic threshold and V is the magnitude of the sample being written. In accordance with the system disclosed, $S_x$=SLOPEX 132, $S_y$=SLOPEYINTERPX 134, and V=INTERPYINTERPX 128. T, the xerographic threshold, is typically set at the halfway point corresponding to how many bits of data are being used to modulate the intensity on the photodiode. For instance, if there are eight bits of data, then T=128. F is a scaling factor to compensate for any difference in the slowscan and fastscan resolutions. If the resolutions are the same, F=1. If the fastscan resolution is four times greater than the slowscan resolution, then F=4. It should be noted that there are many equations that could be used to represent the thresholding function and the equation above is one example.

Figure 9:
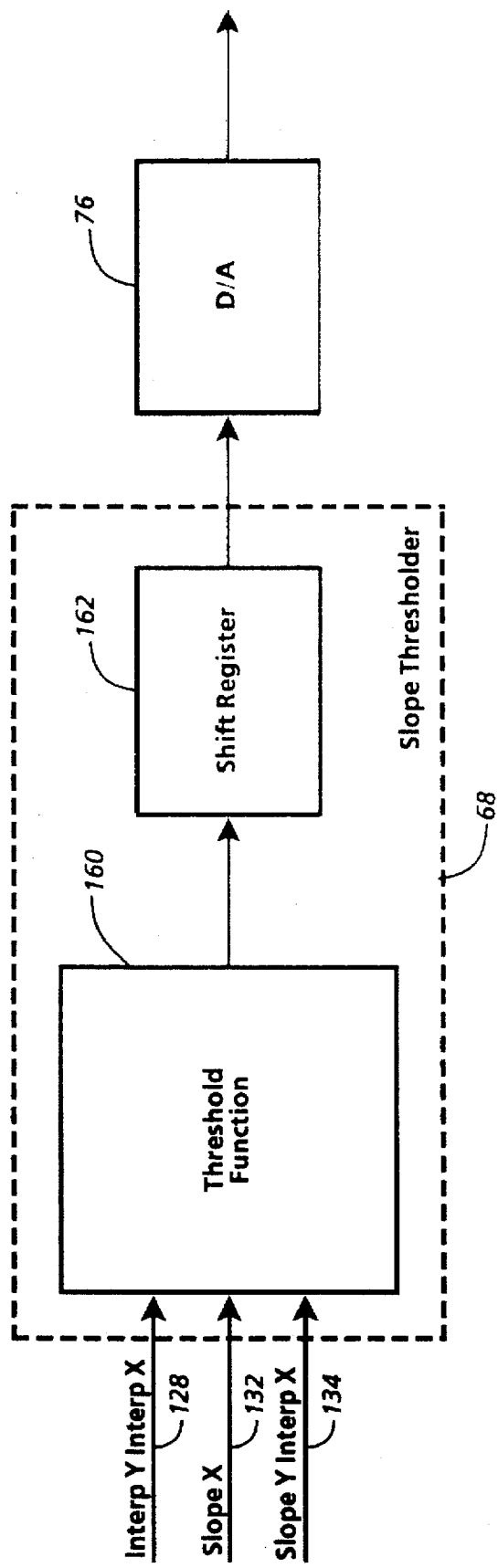
FIG. 9 is a block diagram showing the elements of the slope thresholder.

Referring to FIG. 9, shown is a block diagram including thresholder 68 and D to A converter 76. Included in thresholder 68 is threshold function block 160 and shift register 162. As shown, threshold function 160 receives three input lines from the resampling interpolator, INTERPYINTERPX 128, SLOPEX 132 AND SLOPEYINTERPX 134, representing interpolated data, the x slope, and the interpolated y slope, respectively. Using these input values, threshold function block 160 then renders a multi-bit intensity value to be used by the laser diode. This value can be calculated in real time or stored in a look-up table implemented with a memory block.

It should be noted here that often memory access speed is limited to somewhat slower than the access requirements for retrieving data at the fastscan addressability clock, for instance 4800 clocks per inch, or over 200 MHz in the example system. In that case, the memory fetch for the next n fetches is calculated beforehand by the rendering software, taking into account the spot's estimated position during that time, and the accesses for all n fetches are provided in one fetch in a memory which is n times bigger than otherwise. Those n m-bit values can then be loaded in parallel into an nxm bit shift register 162 and shifted out to the D to A converter, m bits at a time, n times faster. When using n fetches, the value in x INC register 114 of phase resolution controller 66 (FIG. 4) must be multiplied by n. Subsequent fetches would then be made on the next SYSCLK, skipping over n memory locations to the next multi-value fetch.

When threshold function block 160 is implemented as a look-up table, the resulting intensity values, C, are precalculated and stored in a memory block. During run time operation, SLOPEX 132, SLOPEYINTERPX 134, and INTERPYINTERPX 128 are used to address the memory block for the value of C corresponding to the inputs. The slope values take the place of absolute page coordinates to help form the address. Therefore, for each possible address combination, there is a precalculated intensity value corresponding to each address. As previously mentioned, the value of C may also be implemented such that C is calculated during run time operation by using a fast processor or calculating circuitry.

6.0 Halftoner

The purpose of the halftoner is to convert the resampled information from the interpolator into a binary map when pictorials are to be rendered. Pictorials require many levels of gray to be contour free, as well as a fine dot structure to make graininess imperceptible. When representing toneart, that is, pictorials or "natural" images intended for halftoning, sampled data, like that used from the resampling interpolator, can be utilized.

Figure 10:
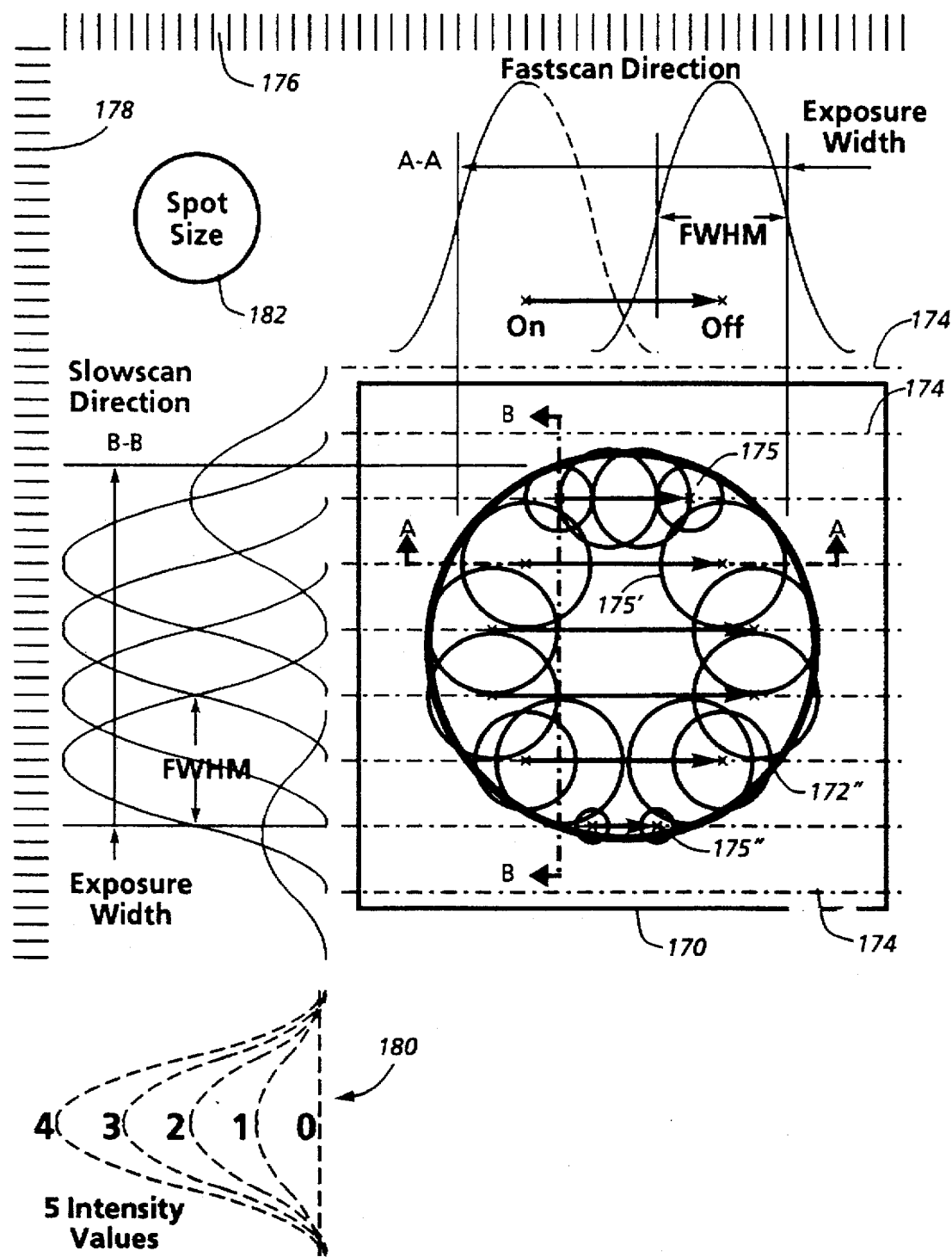
FIG. 10 is a schematic representation of the full creation of a halftone dot.
Figure 11:
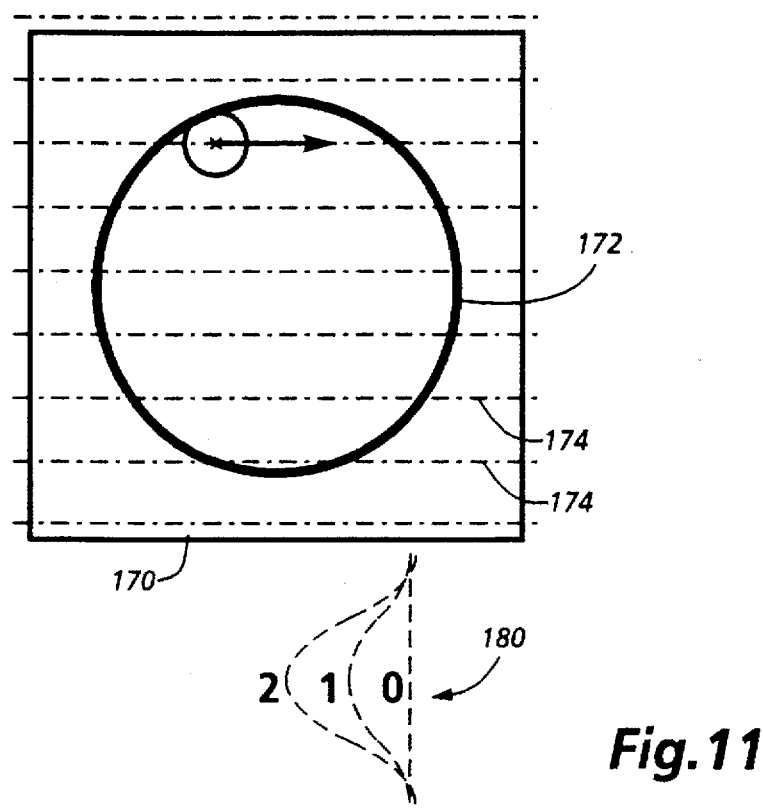
FIG. 11 is a schematic representation of a step in the creation of a halftone dot.

FIG. 10 is a diagram representing the full creation of a halftone dot in a hyperacuity printer. Shown is halftone cell 170, which for this example, is a 1/150 inch on a side, and a halftone dot 172, which is to be rendered. In this example, spot 182 size is 1/600 of an inch with addressability within cell 170 of 1/4800th of an inch in both the fastscan and slowscan directions as indicated by addressability unit markers 176 and 178. Waveforms above and to the left of cell 170 represent the fastscan and slowscan exposure profiles of the laser diode as it writes halftone dot 172. The fastscan exposure profile is taken through section A—A, and the process direction, or slowscan, exposure profile is taken through section B—B. Lines 174 represent scan trajectories and are spaced 1/1200 of an inch apart. This means that the scanner is overscanned, which delivers a more linear response of edge placement to intensity adjustment than if the spot were 1/1200 of an inch, however, the system can be tuned to any spot size or any scan spacing.

The resolution of the spot is determined by the spot size 182. Because of this the diagram showing the different spot sizes 175, 175', 175" may be misleading to the casual reader in implying that the resolution has been increased because the spot size is smaller. On the contrary, the diagram is for explanation convenience only, and the size of the spots 175, 175', 175" helps represent where in the process direction the exposure edge will be rendered with the given intensity. In other words, the smaller spots represent the effect the boundary scan has on the rendered edge. In all cases, the spot size 182 is unchanged because the spot size is measured as the "full width at half max", (FWHM), a measure which is intensity invariant.

In order to render halftone dot 172, scan spots are placed using high addressability such that the edges of the exposure produced by the scanning spot are as close as possible to the target edge of the halftone dot 172. In the fastscan direction, high addressability is accomplished by turning the laser on and off at appropriate places along the scan with 1/4800th of an inch accuracy, which best renders edges which are more or less perpendicular to the scanning direction. In the slowscan direction, intensity adjustment of the boundary scans can be used to gain the high addressability at 1/4800th of an inch as explained in U.S. Pat. No. 5,138,339, and best renders edges which are more or less parallel to the scanning direction. FIGS. 11 through 26 show a step-by-step creation of halftone dot 172.

Figure 12:
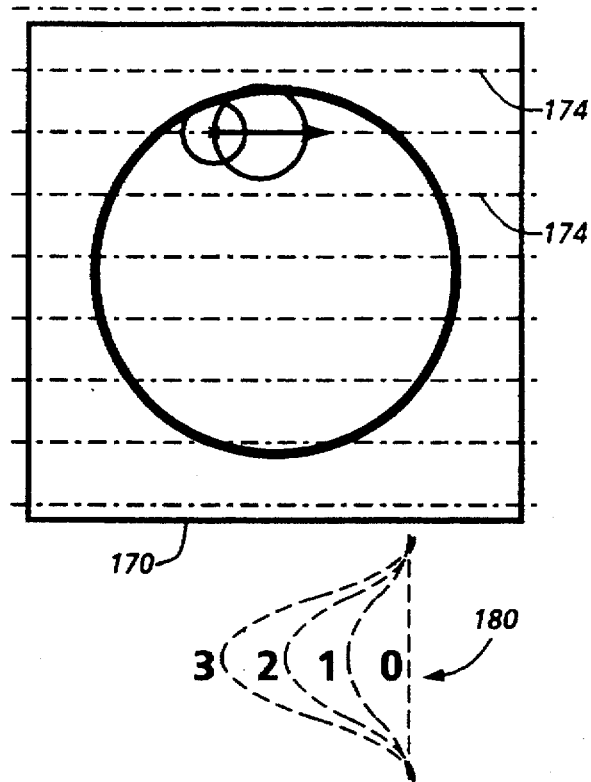
FIG. 12 is a schematic representation of a step in the creation of a halftone dot.
Figure 13:
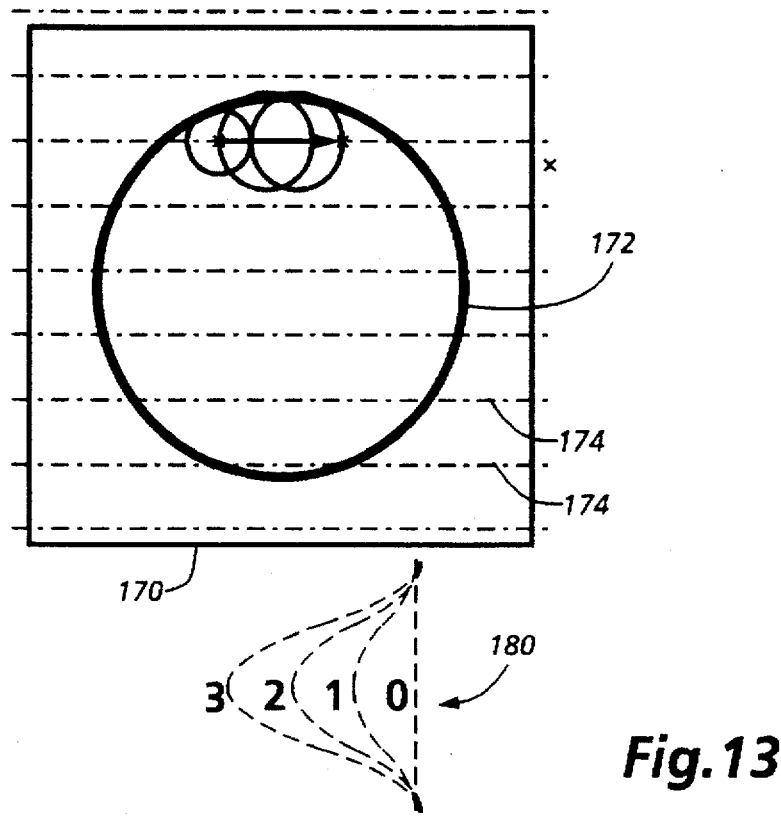
FIG. 13 is a schematic representation of a step in the creation of a halftone dot.
Figure 14:
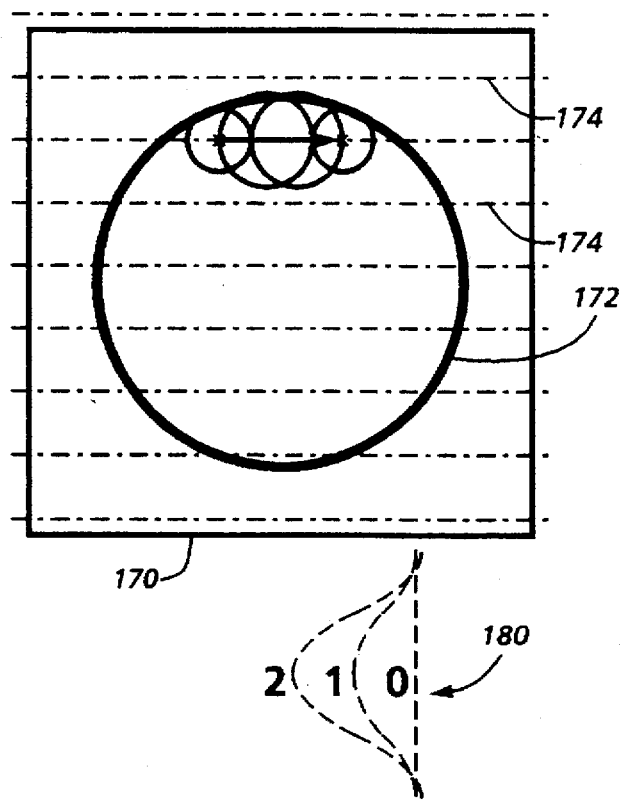
FIG. 14 is a schematic representation of a step in the creation of a halftone dot.
Figure 15:
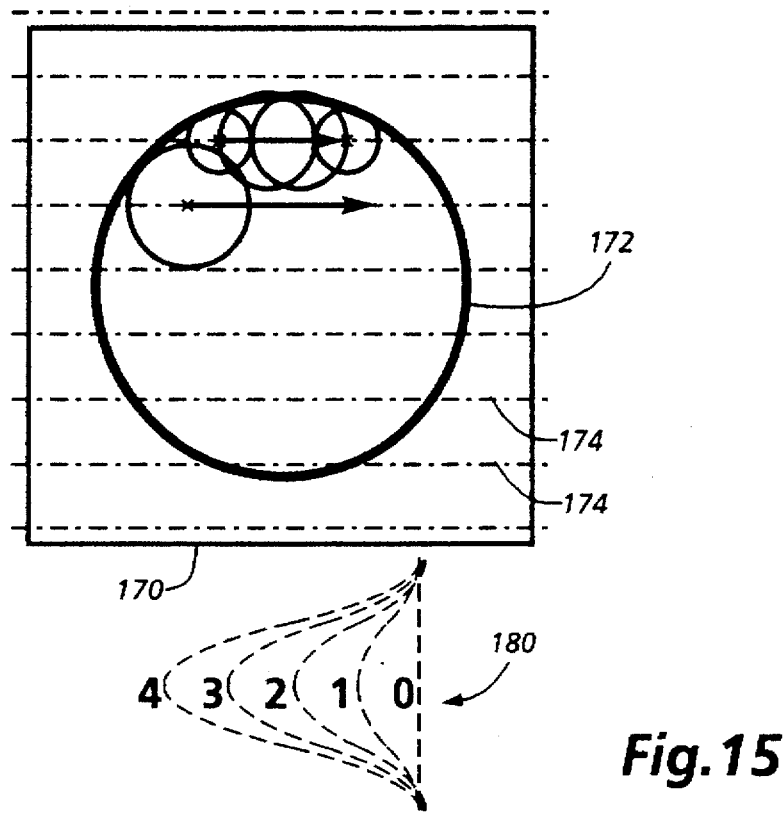
FIG. 15 is a schematic representation of a step in the creation of a halftone dot.
Figure 16:
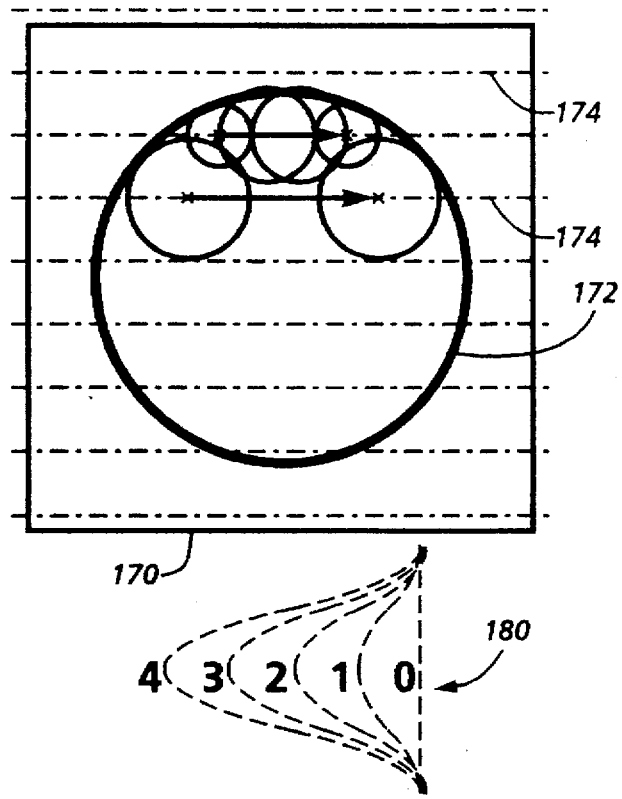
FIG. 16 is a schematic representation of a step in the creation of a halftone dot.
Figure 17:
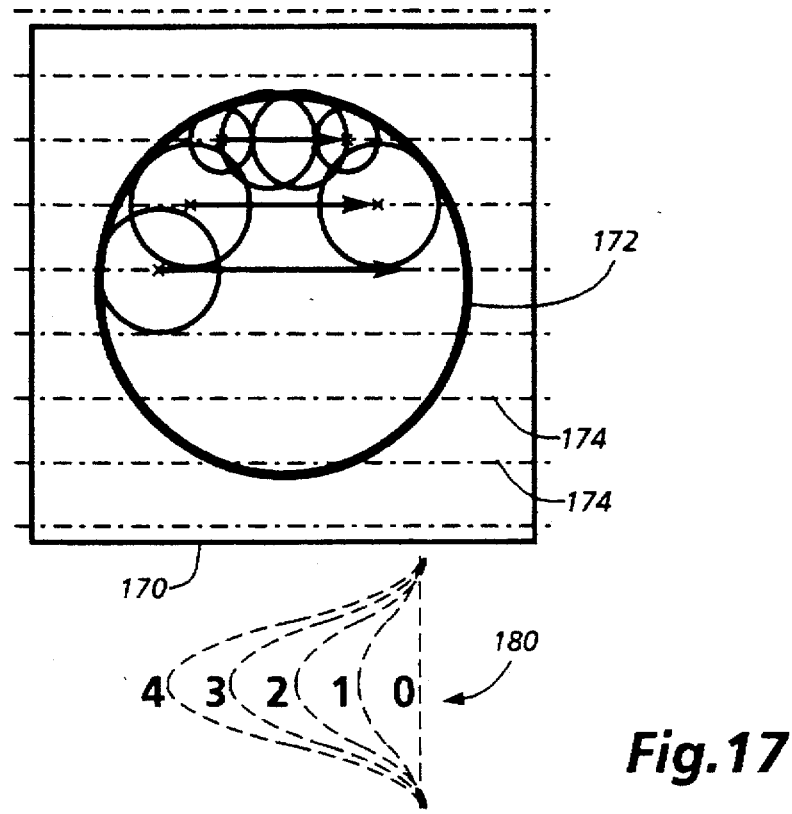
FIG. 17 is a schematic representation of a step in the creation of a halftone dot.
Figure 18:
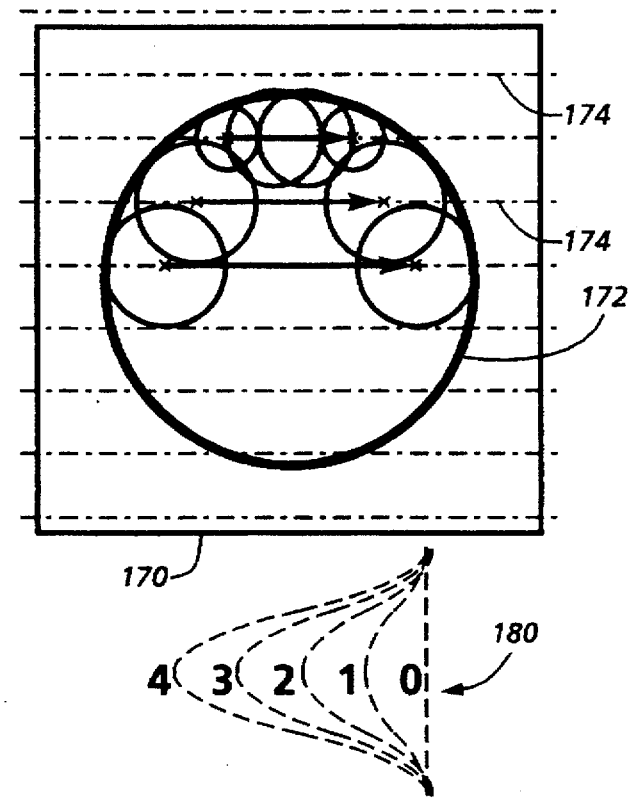
FIG. 18 is a schematic representation of a step in the creation of a halftone dot.
Figure 19:
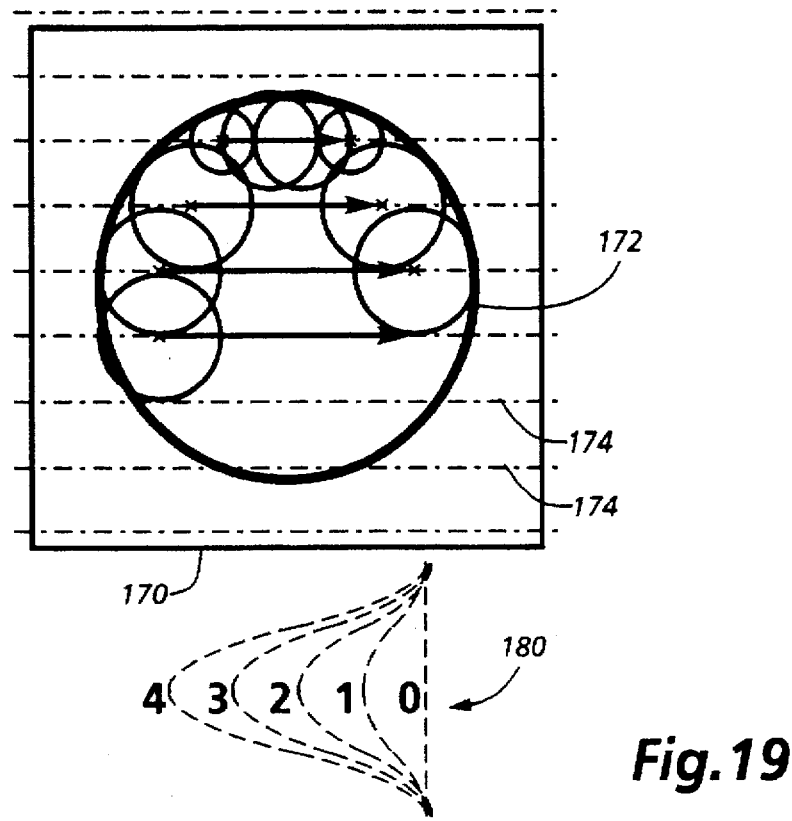
FIG. 19 is a schematic representation of a step in the creation of a halftone dot.
Figure 20:
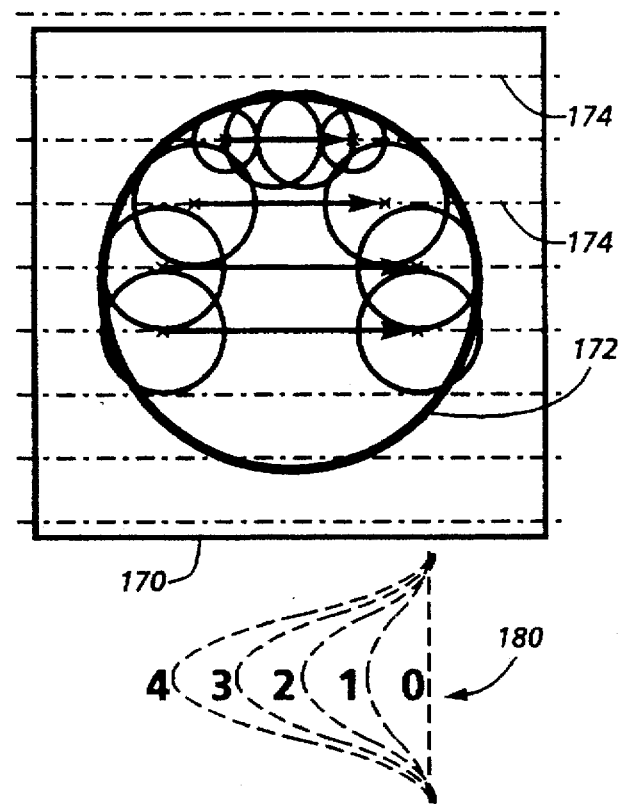
FIG. 20 is a schematic representation of a step in the creation of a halftone dot.
Figure 21:
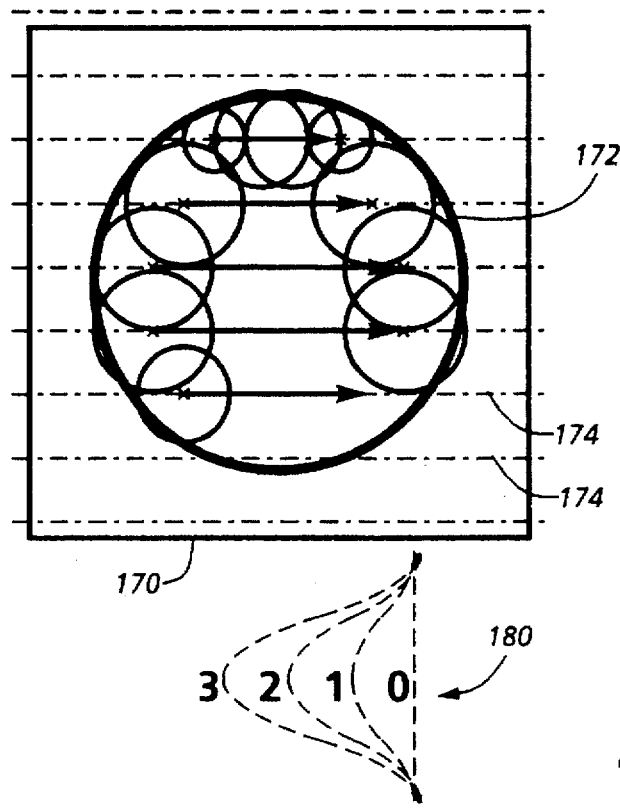
FIG. 21 is a schematic representation of a step in the creation of a halftone dot.
Figure 22:
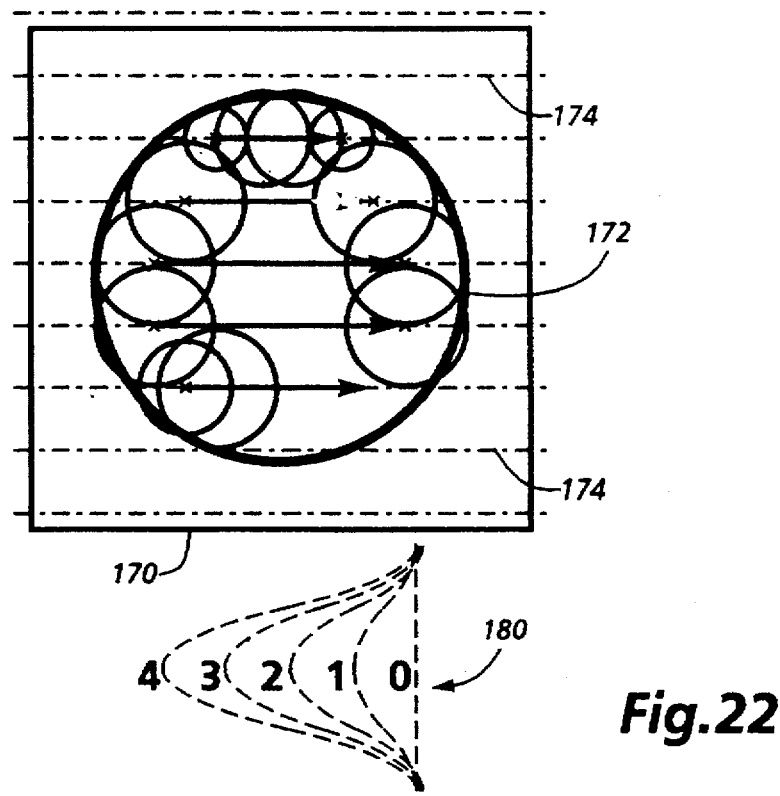
FIG. 22 is a schematic representation of a step in the creation of a halftone dot.
Figure 23:
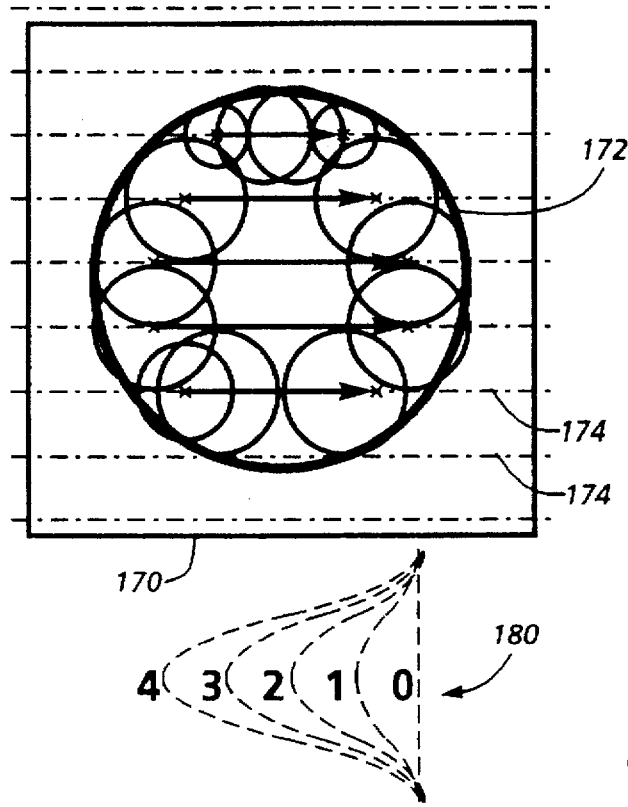
FIG. 23 is a schematic representation of a step in the creation of a halftone dot.
Figure 24:
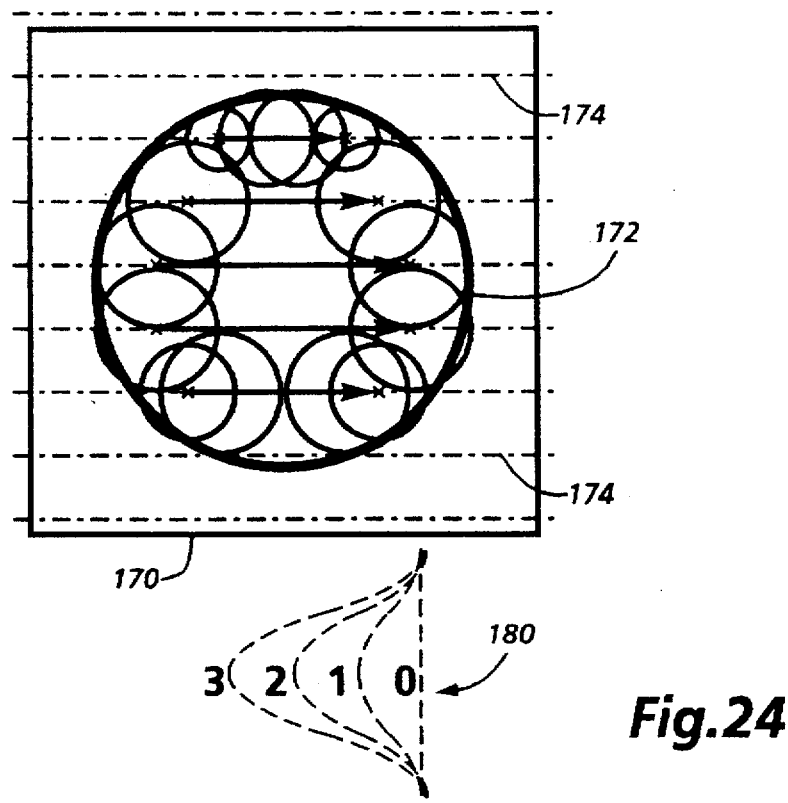
FIG. 24 is a schematic representation of a step in the creation of a halftone dot.
Figure 25:
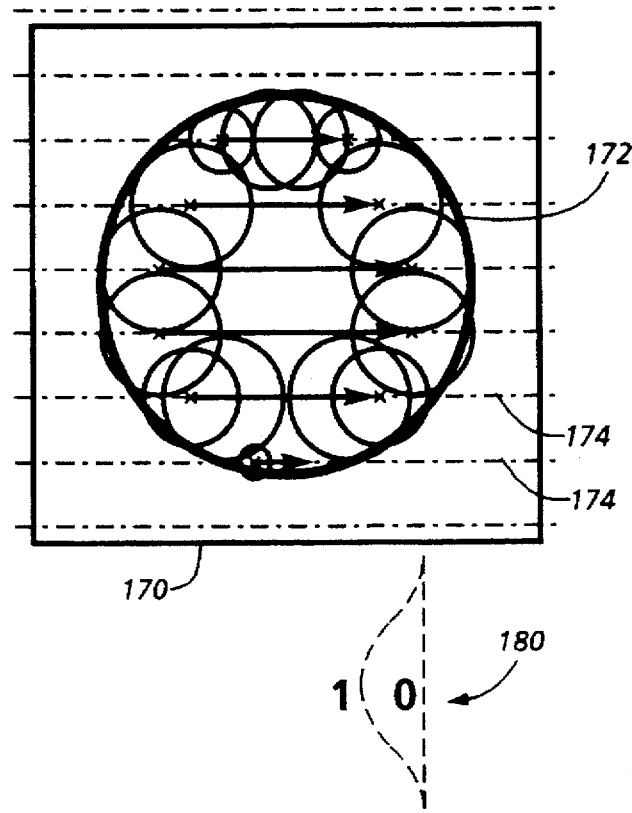
FIG. 25 is a schematic representation of a step in the creation of a halftone dot.
Figure 26:
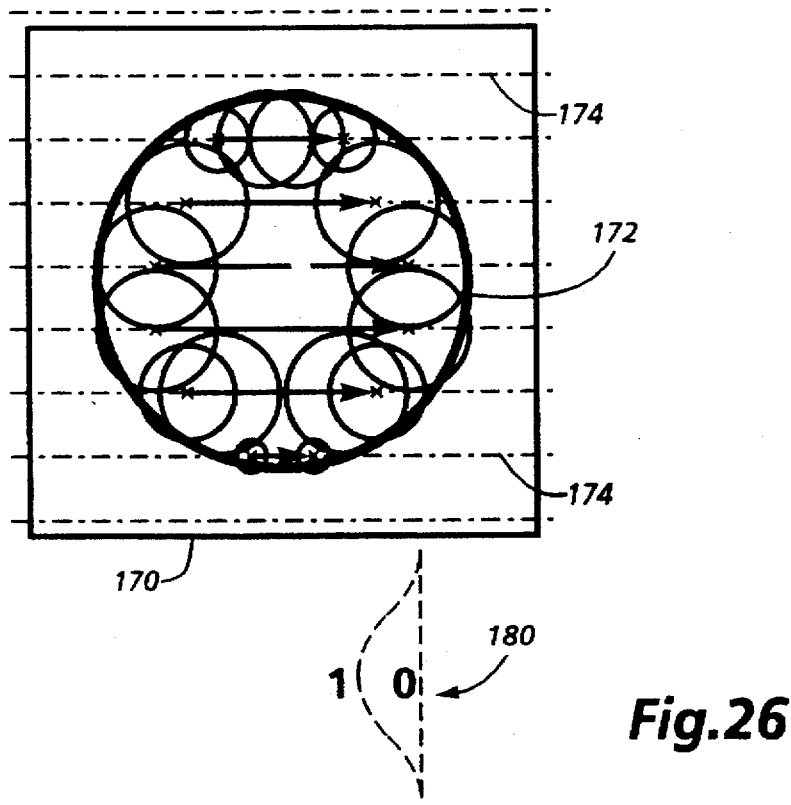
FIG. 26 is a schematic representation of a step in the creation of a halftone dot.

Referring to FIGS. 11 through 26, inclusive, shown in each Figure is a step in the creation of a halftone dot 172 with an associated intensity profile 180. As previously mentioned, the purpose is to try to keep the exposures as close as possible to the target boundary of the halftone dot 172. Beginning with FIG. 11, the first scanline, a first boundary scan of intensity two is shown, and exists for two addressability units in the fastscan direction. Next FIGS. 12 and 13 show the boundary scan increasing to intensity three for several fastscan clocks, and then returning to a scan of intensity two for several clocks as shown in FIG. 14 to finish scanline one. Going on to the next scanline and FIG. 15, the intensity of the boundary scan starts off at level four, or full on, and remains on until the end of the scanline as shown in FIG. 16. Scanlines three and four are written like scanline two, and are represented by FIGS. 17, 18, 19, and 20. Referring next to FIG. 21, scanline five begins with an intensity level three, going to full on (FIG. 22 and 23) then finishes with a level three intensity (FIG. 24). Finally, the halftone dot 172 is completed with scanline six writing intensity level one values as shown in FIGS. 25 and 26.

Figure 27:
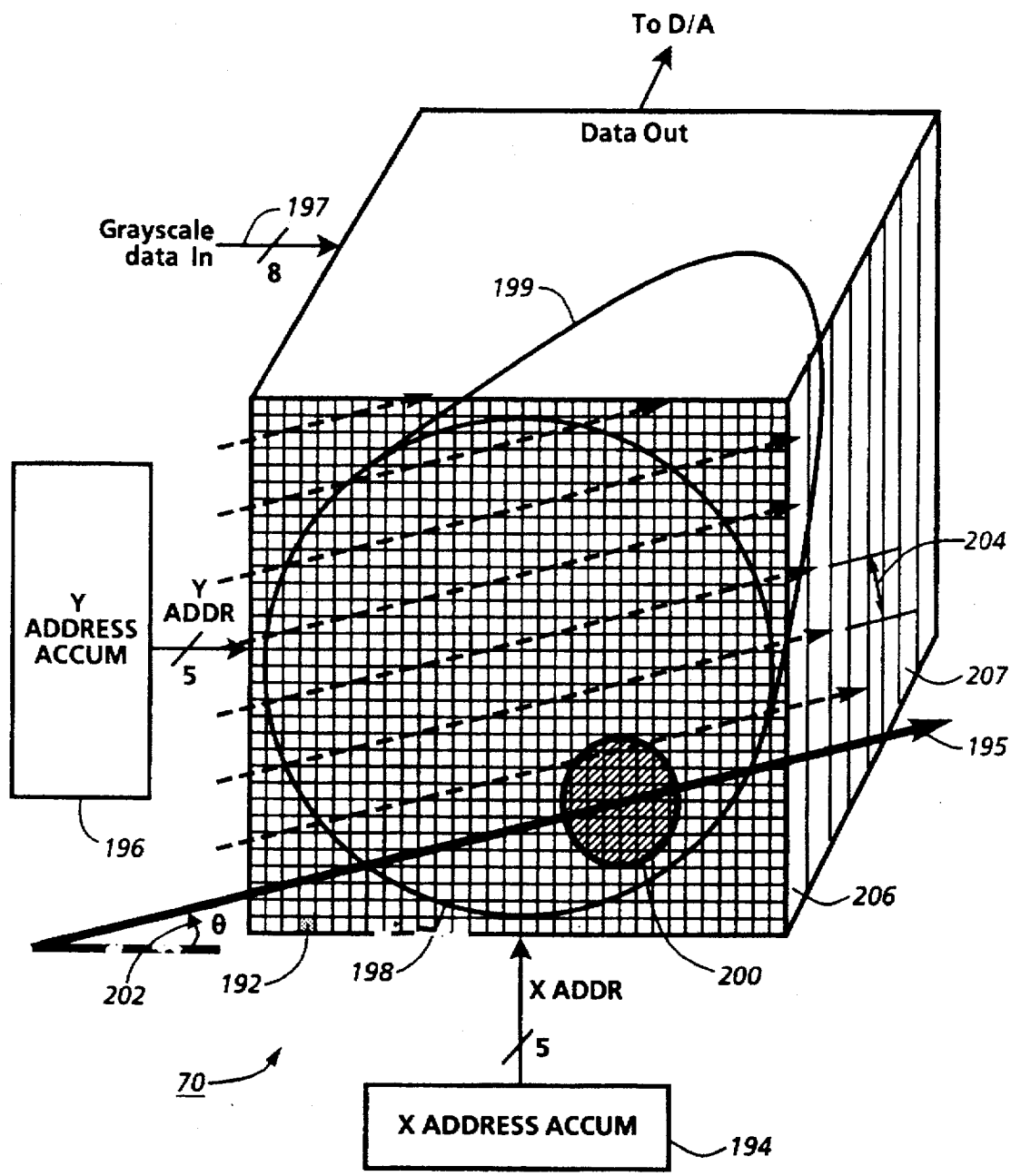
FIG. 27 is a block diagram of the halftoner.

Referring now to FIG. 27, shown is block diagram of a high addressability halftoner 70. Halftoner 70 has a memory block 190 (which is equivalent to dot generator 72) and accumulators 194 and 196 (which are equivalent to screen generator 74). Memory block 190 is divided into an array of addressability units 192 which for this example are 1/4800 of an inch square. Memory block 190 is also divided into 256 different dot planes, one for each grayscale data level. Addressability in the fastscan direction, as designated by arrow 194, is 1/4800th of an inch and scan spacing in the slowscan direction is 1/1200th of an inch as designated by arrow 204. The use of four levels of intensity (created by five values 0%, 25%, 50%, 75%, 100%) instead of binary intensity allows addressability in the slowscan direction to also be 1/4800th of an inch.

Memory 190 is presented as a slice through the intensity dimension of a three dimensional object by dividing its address lines into three sets, one for the x dimension, one for the y dimension and one for the intensity dimension. These addresses are provided by x address accumulator 194, y address accumulator 196 and grayscale data input line 197. The x and y address accumulators provide the x and y component of the screen address used for rotating the screen, such as shown in angle 202. This address information represents the position of laser diode spot 200 in the x,y plane.

For the intensity dimension, the grayscale data input 197, from the interpolator, determines which one of the 256 dot planes, such as 206 or 207, for instance, is being accessed. Typically, as the value for the grayscale data 197 changes, the radius (or other density determining parameter) of the halftone dot changes, as represented by the three dimensional "bullet" shape 199 in the diagram. One of the 256 halftone dots, this one in the midrange where the memory has been sliced, is shown as halftone dot profile 198 in dot plane 206. If a highlight dot is to be rendered, the grayscale data in 197 will select a dot plane with a dot profile that has a small radius, such as might be in plane 207. A shadow dot would be on the other side of plane 206 from 207 and is not shown.

The halftone screen is a regular rectangular array of dot positions covering the entire image. Accumulators 194 and 196 track the trajectory of laser spot 200 as shown by line 195. The trajectory moves through the memory at a screen angle θ shown as arrow 202. The five bits from each of the accumulators provide a thirty-two by thirty-two position halftone tile for defining a halftone dot for each of the 256 halftone dots addressed by grayscale input value 197. Therefore, there are a total of 1024 positions within each tile defining a given halftone dot. As will be discussed in reference to FIG. 28, accumulators 194 and 196 increment fractionally, but provide their five most significant bits as address YADDR and XADDR to memory 190. As they increment they will periodically rollover in x and y, thereby replicating the halftone cell, into a regular two dimensional array over the entire image area. While this is occurring, the intensity is varying, causing different dot layers to be accessed, thereby modifying the density of the image. The data fetched at each memory location is one of the five values (0%, 25%, 50%, 75%, or 100%) required by the digital to analog converter to cause the laser spot to have the intensity required to render the halftone dot as shown in FIGS. 10 through 26.

There are two notable characteristics of this halftone generator 70. First, the value obtained at each memory location is a value meant to go directly to the D to A converter 76. This differs from prior art where numbers accessed are generally compared with the input intensity value 197 by a binary comparator which outputs either a zero or one to drive the laser diode, and which has only two dimensions in the memory array since the grayscale data in 197 is sent to the comparator instead of the third dimension of a memory array. The prior art saves memory but this method is more flexible and allows gray output.

Secondly, the halftone cell is accessed scanline by scanline, which is a number of addressability units (gray levels) apart. For instance, in this example, there are four gray levels, allowing four subscanline edge position opportunities per scan, and there are 1200 scans per inch, giving 4800 per inch addressability in the slowscan direction. The scans are four addressability units apart. Because of this, the scans only sample one fourth of the memory locations available in the halftoner as the scan structure passes through. This means there are four phases which the scan structure can pass through. Since the halftoner accumulators are loaded with numbers which have fractional values, (because there is a requirement for halftone screen at any frequency and any angle), the scan access will typically roll through all four phases periodically as the image is made. This creates an irrational halftone generator. It is the intent of the rendering data loaded into the halftoner to achieve the same exposure on the photoreceptor regardless of the phase in which the scan structure passes through the cell. This will be helped by (1) increasing the addressability in both the fastscan and slowscan direction to minimize quantization error; and (2) overscanning as in U.S. Pat. No. 5,138,339, which allows better control of exposure edge placement in the process direction.

It should be noted here that often memory access speed is limited to somewhat slower than the access requirements for retrieving data at the fastscan addressability clock, for instance 4800 clocks per inch, or over 200 MHz in the example system. In that case, the memory fetch for the next n fetches is calculated beforehand by the rendering software, taking into account the screen angle and frequency, and the accesses for all n fetches are provided in one fetch in a memory which is n times bigger than otherwise. Those n m-bit values can then be loaded in parallel into an nxm bit shift register (like shift register 162 of FIG. 9) and shifted out to the D to A converter m bits at a time, n times faster.

Figure 28:
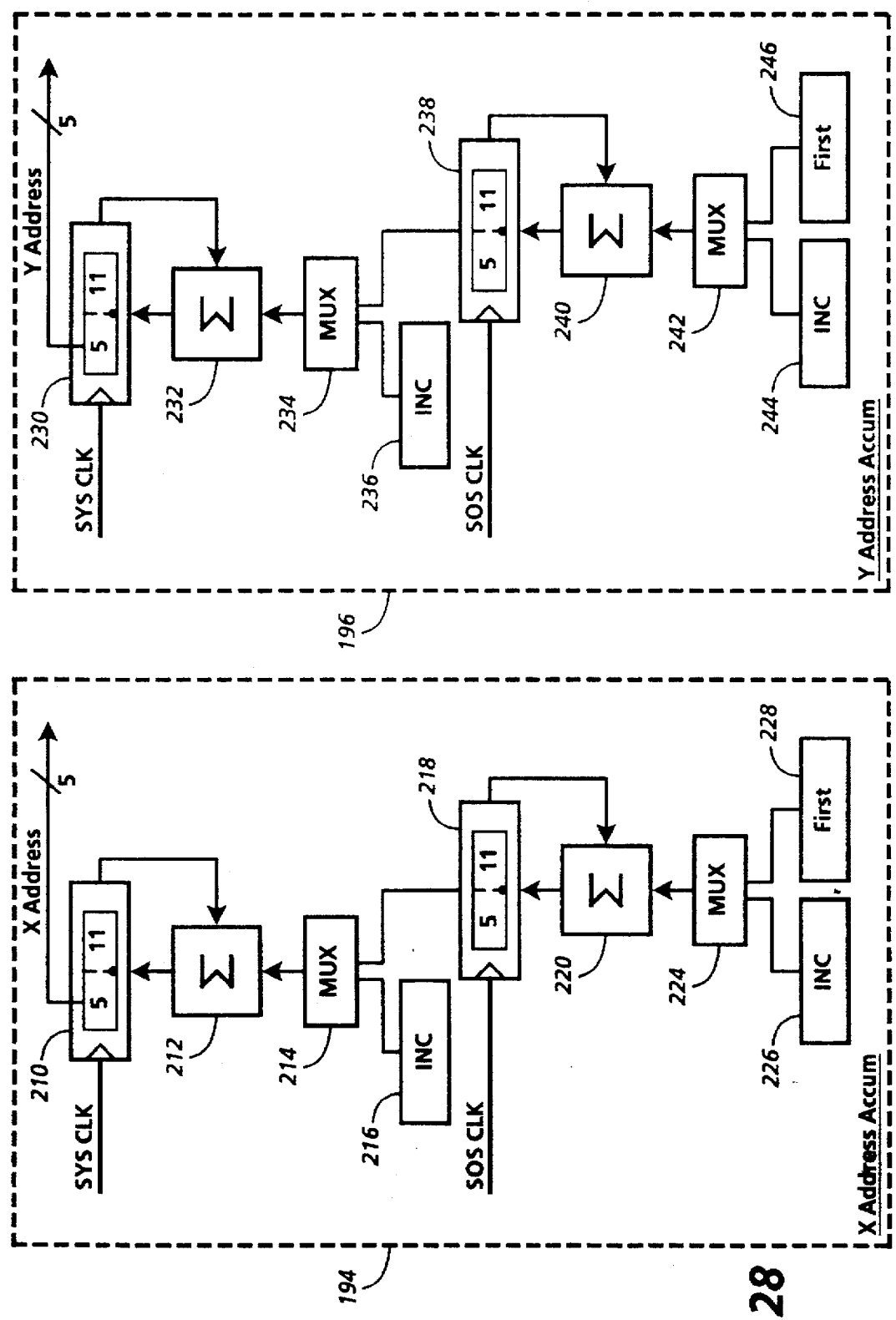
FIG. 28 is a block diagram of the x and y accumulators of the halftoner in FIG. 26.

Referring to FIG. 28, shown is detailed block diagram of both the x address accumulator 194 and y address accumulator 196. X address accumulator has register 210 which accumulates a value having five bits of integer and eleven bits of fraction. The five bit integer portion supplies signal XADDR, or the x address, for memory block 190 of the halftoner. Accumulator 194 includes full adder 212 and multiplexer 214. Multiplexer 214 selects either INC register 216 or register 218 to be an input to full adder 212. Register 218 accumulates a value having five bits of integer and eleven bits of fraction. Accumulator 194 further includes full adder 220 and multiplexer 224. Multiplexer 224 selects either INC register 226 or First register 228 as an input into full adder 224.

The hardware of Y accumulator 196 is identical to that of x accumulator 194. As will be seen, the differences are in the values loaded into the registers, as the registers represent the x and y component of the screen angle. Y address accumulator 196 has register 230 which accumulates a value having five bits of integer and eleven bits of fraction. The five bit integer portion supplies signal YADDR, or the y address, for memory block 190 of the halftoner. Accumulator 196 includes full adder 232 and multiplexer 234. Multiplexer 234 selects either INC register 236 or register 238 to be an input to full adder 232. Register 238 accumulates a value having five bits of integer and eleven bits of fraction. Accumulator 196 further includes full adder 240 and multiplexer 242. Multiplexer 242 selects either INC register 244 or First register 246 as an input into full adder 242.

In operation, There are six registers that must be preloaded, three in x accumulator 194 and three in y accumulator 196. The values in the registers are variable and must be calculated prior to printing a page. Calculations will be discussed below. The following are assignments of variables to their respective registers: XFastStepINC is loaded into INC register 216; XSlowBoLINC is loaded into INC register 226; XSlowBoLFIRST is loaded into FIRST register 228; YFastStepINC is loaded into INC register 236; YSlowBoLINC is loaded into INC register 244; and YSlowBoLFIRST is loaded into FIRST register 246.

In order to scale the locations of boundaries to the halftoner memory array, the number of memory locations per SYSCLK (the number of memory locations traversed during one SYSCLK) must be determined in the fastscan direction, and the number of memory locations per facet (the number of memory locations traversed while the polygon rotates through one facet) must be determined in the slowscan direction.

$$\frac{\text{Memory Locations}}{\text{SYSCLK}} = \qquad \text{Equation 1}$$

$$\frac{\text{Memory Locations}}{\text{CELL}} \times \frac{\text{CELLS}}{\text{INCH}} \times \frac{\text{INCHES}}{\text{SYSCLK}}$$

$$\frac{\text{Memory Locations}}{\text{FACET}} = \qquad \text{Equation 2}$$

-continued
$$\frac{\text{Memory Locations}}{\text{CELL}} \times \frac{\text{CELLS}}{\text{INCH}} \times \frac{\text{INCHES}}{\text{FACET}}$$

Once this scaling information is calculated, it can be used in turn to calculate the x and y components for the six registers.

$$\text{XFastStepINC} = \left(\frac{\text{Memory Locations}}{\text{SYSCLK}}\right) \cos\theta$$

$$\text{XSlowBoLINC} = \left(\frac{\text{Memory Locations}}{\text{FACET}}\right) \cos(90-\theta)$$

$$\text{XSlowBoLFIRST} = \left(\frac{I}{Q}\right)\left(\frac{\text{Memory Locations}}{\text{FACET}}\right) \cos(90-\theta)(ch)$$

$$\text{YFastStepINC} = \left(\frac{\text{Memory Locations}}{\text{SYSCLK}}\right) \sin\theta$$

$$\text{YSlowBoLINC} = \left(\frac{\text{Memory Locations}}{\text{FACET}}\right) \sin(90-\theta)$$

$$\text{YSlowBoLFIRST} = \left(\frac{I}{Q}\right)\left(\frac{\text{Memory Locations}}{\text{FACET}}\right) \sin(90-\theta)(ch)$$

Figure 29:
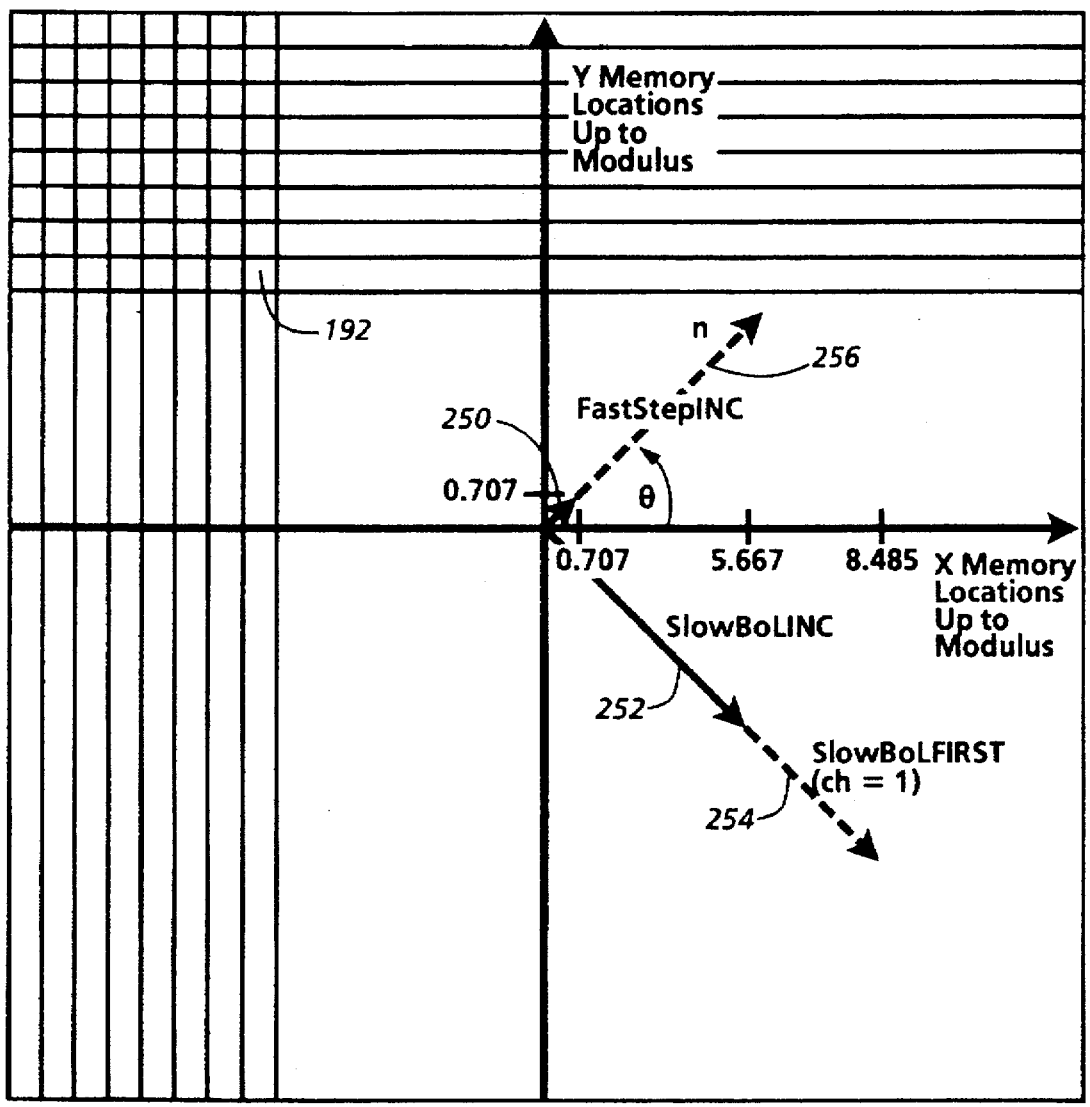
FIG. 29 is a graphical representation of the values loaded into the x and y accumulators of FIG. 27.

Referring also to FIG. 29 to help understand the relationship among the registers and their load values, the spot can be visualized as traveling over the face of a cross-section of the halftone memory, where block 192 represents an addressability unit. The values in the registers track the movement of the spot and the modulo of the number of memory locations per cell over the face.

The x and y FastStepINC registers together track the spot's fastscan progress, and have units of memory locations per SYSCLK, since the registers are clocked by the SYSCLK. The x and y SlowBoLINC registers together track the spot's slowscan progress, and have units of memory locations per facet, since the registers are clocked once per facet by the start of scan signal.

Both the fast and slow increments above are the same for all channels, regardless of the number of sources, however, the SlowBoLFIRST is dependent on the channel number (ch). I is the interlace factor in scans per beam and Q is the number of scans per facet (i.e., the number of beams in a multi-beam system), so I/Q has units of facets per beam. Therefore, the units for SlowBoLFIRST is (memory locations per facet) times (facets per beam)=(memory locations per beam). The slow beginning of line first value (SlowBoLFirst), then, is the number of memory locations to stagger each channel in a multi-beam system at the start of an image to accomplish interlacing.

For example, in the fastscan direction, memory locations per cell=32, halftone cells per inch=150 and inches per SYSCLK=1/4800, therefore memory locations per SYSCLK= 1. In the slowscan direction, memory locations per cell=32, cells per inch=150 and inches per facet=600, therefore, memory locations per facet=8. And finally, $\ominus$=45 degrees. Substituting in to the above equations, values for XFastStepINC=0.707, XSlowBoLINC=5.667, XSlowBoLFIRST=0 for channel 0, 8.485 for channel 1, etc., YFastStepINC=0.707, YSlowBoLINC=5.667, and YSlowBoLFIRST=0 for channel 0, 8,485 for channel 1, etc. and can be loaded into their respective registers.

In FIG. 29, arrow 250 represents both the XFastStepINC and the YFastStepINC vector. In a similar manner, arrow 252 represents both the XSlowBoLINC and YSlowBoLINC vectors. Arrow 254 represents both the XSlowBoLFIRST and YSlowBoLFIRST vector for a channel greater than zero, in this case channel 1. Arrow 256 represents an extension to arrow 250 by a magnitude n, where n is the number of values fetched on one memory access as described above.

Note that for a sixteen bit register, five bits above the heximal point leaves eleven bits below the heximal point for the fractional part as shown in FIG. 28. These values are found by normal twos compliment arithmetic by converting the decimal value to its twos compliment hexadecimal value.

In operation, registers 216, 226, 228, 236, 244, and 246 are pre-loaded. At the start of printing a page, the value stored in FIRST register 228 becomes an input to full adder 220 through MUX 224. In a similar manner, the value stored in FIRST register 246 becomes an input to full adder 240 through MUX 242. Once the page has begun, MUX 224 switches so that the input to full adder 220 is the increment value stored in INC register 226. In a similar manner, MUX 242 switches to INC register 244. Register 218 is incremented by the value from INC register 226 every SOS, (start of scan) clock. Register 238 is also incremented by the value in INC register 244 every SOS clock. In this way, the starting position for the scanlines within the halftone screen are calculated as printing progresses.

At the start of each scan, the value in register 218 becomes an input into adder 212 through mux 214 and the value in register 238 becomes an input into adder 232 through mux 234. Mux 214 then switches to connect INC register 216 to adder 212 and mux 234 switches to connect INC register 236 to adder 232. Register 210 is then incremented by the value from INC register 216 upon every SYSCLK (system clock). Register 236 is also incremented by the value in INC register 236 upon every SYSCLK. As defined using the example values, SYSCLK occurs ever 1/4800th of an inch. In this way, the incremental positions of the spot within the halftone screen are calculated as printing progresses. These values are then used as the memory address for a memory fetch operation.

For the case where the memory accesses would occur too fast for a physical memory fetch as mentioned above, the equation for the memory access address in the fastscan direction is multiplied by n where n is the number of MicroCLKs per SYSCLK, and n simultaneous fetches are made while making the memory data word n times bigger. Subsequent fetches would then be made on next SYSCLKs, skipping over n memory locations to the next multi-value fetch. In this case, distance in the fastscan direction would be measured in MicroCLKS instead of SYSCLKs. Therefore, it would be necessary to modify equation 1 above to determine the number of memory locations per Micro-CLK as follows:

For example, if eight memory fetches were to be made in one SYSCLK, the number of SYSCLKs per MicroCLK would be ⅛, or in other words, there would be 8 MicroCLKS per SYSCLK.

$$\frac{\text{Memory Locations}}{\text{MicroCLK}} =$$

$$\frac{\text{Memory Locations}}{\text{CELL}} \times \frac{\text{CELLS}}{\text{INCH}} \times \frac{\text{INCHES}}{\text{SYSCLK}} \times \frac{\text{SYSCLK}}{\text{MicroCLK}}$$

The information stored in memory 190 of FIG. 27 must also be precalculated before printing a page. In general, for each defined intensity 197 input to the memory, a corresponding halftone dot must be defined and stored in memory planes 206 or 207, for example. Once the shape and size of the halftone dot is defined with respect to the size of the memory array, each dot needs to be scaled, thereby defining it in the fastscan direction as number of SYSCLKs, and the slowscan direction as number of levels. Finally, each halftone dot has to be rendered such that each memory location defining the halftone dot is assigned a value corresponding to the intensity of the signal being written by the laser diode.

In order to calculate values for the halftone look-up table, several parameters must be defined. These parameter are screen angle and screen frequency in both the fastscan direction and slowscan direction, modulus and addressability in the fastscan direction, number of facets per inch, number of scans per facet (Q), and number of levels per scan in the slowscan direction. In keeping with the exemplary values used throughout this disclosure, screen angle is 45 degrees, screen frequency is 150 halftone dots per inch, modulus is 32 (corresponding to the number of bits used for the x and y addressing), fastscan addressability is 4800 SYSCLKs per inch, facets per inch equal 600, scans per facet equal 2 and levels per scan equal 4, for a slowscan addressability of 4800 levels per inch also.

Referring to FIGS. 30 through 33, inclusive, shown are halftone dot planes with examples of halftone dots. As previously mentioned, the first step in determining values for the halftone memory is to grow, or define, each of the 265 halftone dots. The dots can be grown utilizing an algorithm that takes into account the TRC (Tonal Reproduction Curve) and shape of the dots. FIGS. 30 through 33 give four examples of such dots. It can be appreciated that there are many ways to grow halftone dots as well as many shapes that halftone dots can have. The following dots are examples and are not meant to be limiting.

Figure 30:
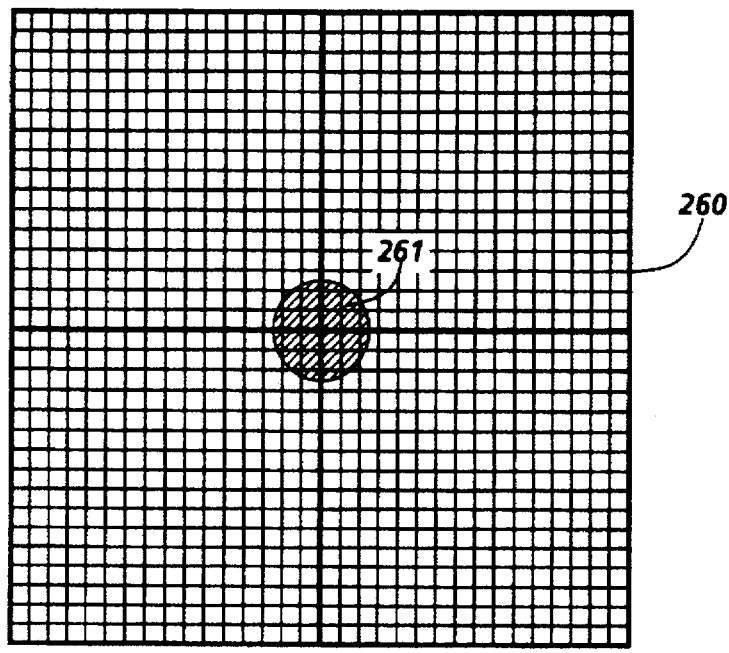
FIG. 30 is a graphical representation of a halftone dot.
Figure 31:
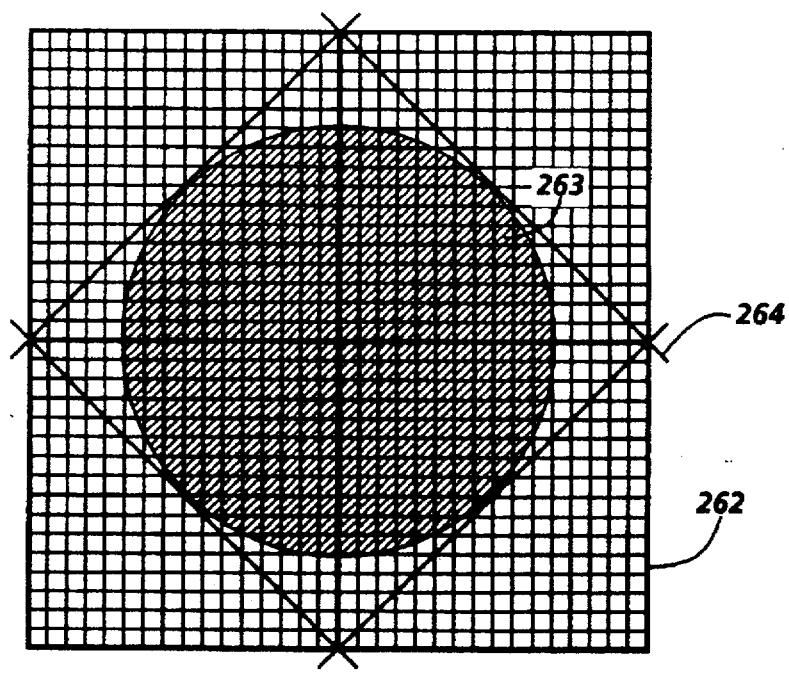
FIG. 31 is a graphical representation of a halftone dot.
Figure 32:
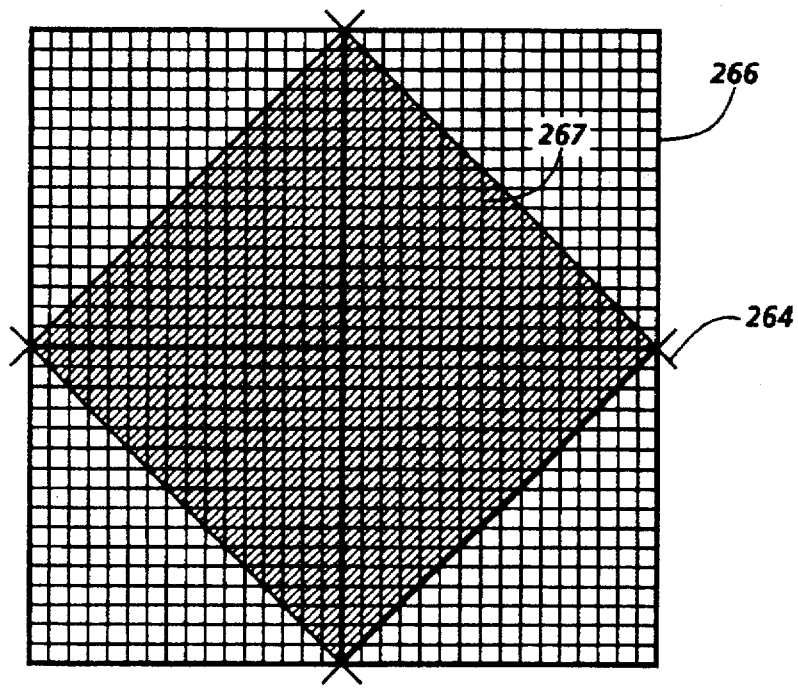
FIG. 32 is a graphical representation of a halftone dot.
Figure 33:
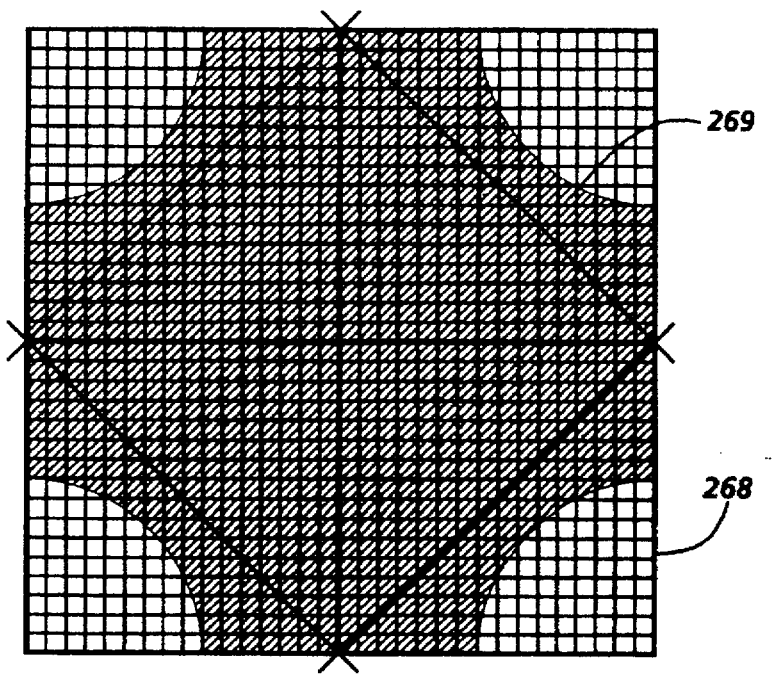
FIG. 33 is a graphical representation of a halftone dot.

Beginning with FIG. 30, halftone dot plane 260 represents a 32×32 bit address space defining halftone dot 261. As can be seen halftone dot 261 is essentially circular and represents a certain density. As the densities increase, the halftone dots grow as shown in FIG. 31. FIG. 31 shows halftone dot plane 262 with corresponding dot 263. It is to be understood that there are many levels and sizes of halftone dot between FIGS. 30 and 31. Also shown is diamond region 264. As the halftone dots are grown, they remain circular until they hit the boundary of diamond region 264. Then the dots are grown radially to fill in the diamond region, until the entire region is filled as shown in FIG. 32. FIG. 32 shows dot plane 266 with corresponding dot 267. Dot 267 can represent a density level near 128, since it conveys an attempt to render fifty percent of the halftone cell as black, however, when taking into account the tone reproduction curve of the printer, this fifty percent coverage may not exactly coincide with intensity level 128. FIG. 33 shows halftone dot plane 268 with dot 269 grown outside of diamond region 264, again radially. However, the centers of radius not are at the corners of the dot cell 268. The blank semi-circular spaces at the corners of cell 268 join with other cells to make round spots with diminishing size. As can be envisioned, the halftone dots would continue to grow until a dot plane is completely filled at density level 255 (not shown).

The next step in determining the values for the halftone memory is to scale the grown halftone dots into printer defined space of SYSCLKs in the fastscan direction and intensity levels in the slowscan direction. The distance to any boundary from any memory location is available in units of memory locations, as these were the units used to grow the halftone dot in the previous paragraph. The component of distance in the fastscan direction is multiplied by the number of SYSCLKs per memory location, as previously calculated in equation 1 above, to determined the distance in SYSCLKs. Likewise, the component of distance in the slowscan direction is multiplied by the number of levels per memory location to yield the distance in levels. To obtain the number of levels per memory location, two additional pieces of information are required in addition to equation 2 above.

Equation 2 gives the number of memory locations per facet, to which the number of facets per scan (e.g. ½), and the number of scans per level (e.g. ¼) are multiplied to obtain the number of memory locations per level as follows:

$$\frac{\text{Memory Locations}}{\text{LEVEL}} = \frac{\text{Memory Locations}}{\text{CELL}} \times$$

$$\frac{\text{CELLS}}{\text{INCH}} \times \frac{\text{INCHES}}{\text{FACET}} \times \frac{\text{FACET}}{\text{SCAN}} \times \frac{\text{SCAN}}{\text{LEVEL}}$$

Finally, each edge in each of the 256 halftone dot planes needs to be rendered by assigning an intensity value to the memory locations. If the edge to be rendered is primarily perpendicular to the fastscan direction, timing is used to render the edge, and the rendering algorithm will utilize an on-to-off or off-to-on transition which has no intermediate gray values to achieve the steepest slope in exposure possible. The rendering algorithm must also take into account the fastscan width of the spot, the quantization of the fastscan clock, and other xerographic development transfer functions.

If the edge to be rendered is primarily parallel to the slowscan direction, gray will be used to achieve subscan precision of the edge, and the appropriate gray value will be assigned to that memory location. The rendering algorithm must also take into account the slowscan width of the spot (which sets the linearity of the intensity to edge placement position), the number of levels being used, the scan pitch, and other xerographic development transfer functions. This can be seen in FIG. 10, and FIGS. 11 through 26, where the fastscan is using timing to render and the slowscan is using gray to render. As previously mentioned, these intensity values go directly to a D to A converter to be written by the laser diodes.

One way of rendering the halftone dot is to grow gaussians of the shape of the spot at every possible position for the laser spot in the immediate past and future with respect to a memory location. The gaussians could be grown such that in the center of the halftone dot they would be full on and outside the halftone dot they would be full off (for a write black system, for instance), and at the edge of the halftone dot they would be grown just enough to move the exposure edge, (which is the composite sum of all the gaussians), over to coincide with the boundary of the dot being rendered. Once that is done, the level needed for that particular memory location can be written.

So far, the halftoner has been described using a fixed number of memory locations per halftone cell dictated by a fixed addressing scheme. However, there may be cases where a 32×32 bit halftone cell is not optimum for a particular application. Therefore, a variable modulus addressing scheme would be useful. Such a scheme could allow any sized halftone cell to be used without changing the hardware.

Figure 34:
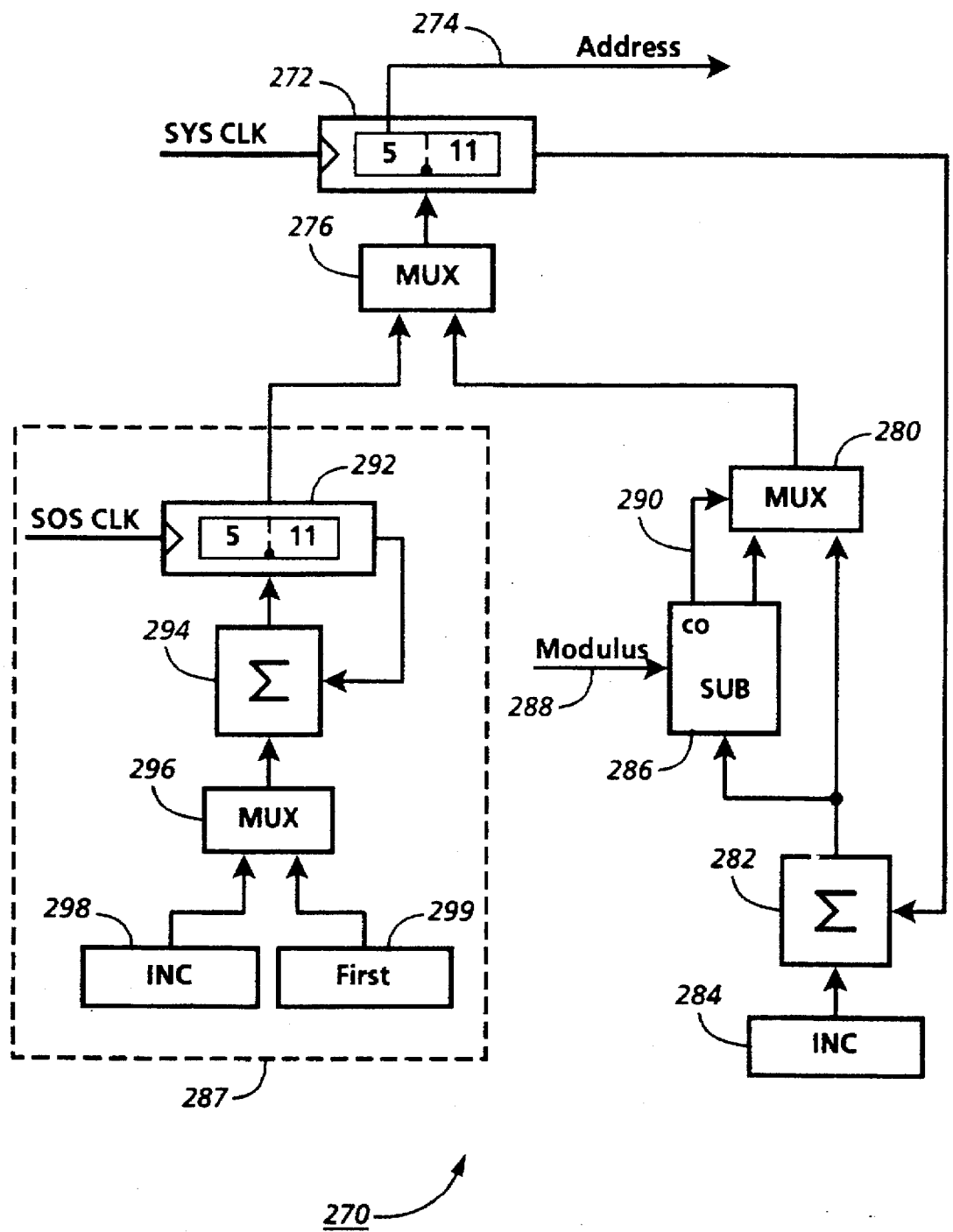
FIG. 34 is a block diagram of a variable modulus accumulator used for addressing the halftoner memory block.

Referring to FIG. 34, shown is a block diagram of a variable modulus address accumulator 270. Address accumulator 270 may be substituted for either or both x address accumulator 194 and y address accumulator 196 (FIGS. 27 and 28). The use of address accumulator 270 provides the opportunity to use a smaller memory block or different sized halftoned cells. It can be appreciated that this scheme as described can accommodate any modulus up to 32, including a fractional modulus. However, by adding more bits to the addressing, a modulus of any size can be envisioned. A variable modulus accumulator can be substituted for the x accumulator, the y accumulator, or both.

Variable address accumulator 270 includes register 272 which provides a five bit integer value, ADDRESS line 274, to be used in addressing the halftoner memory block. ADDRESS line 274 can be substituted for the XADDR line or YADDR line. Address accumulator 270 also includes mux 276, start block 278, mux 280, full adder 282 INC register 284 and subtracter 286.

The components in START block 278 are equivalent to components described in FIG. 28 and are operated accordingly. In particular, register 292 is equivalent to register 218 and 238. Full adder 294 is equivalent to adder 220 and 240. In a similar manner, mux 296 is like mux 224 and mux 242, and INC register 298 is equivalent to INC register 226 and INC register 244. INC register 298 is loaded with a SlowBoLINC value, a XSlowBoLINC value if it is being used as an x address and a YSlowBoLINC value if it is being used as a y address. Finally, FIRST register 299 is like that of FIRST register 228 and FIRST register 246, and are loaded with x and y SlowBoLFIRST values. Comparing other components of address accumulator 270 with address accumulators 194 and 196, register 272 is like register 210 and register 230. Mux 276 is equivalent to mux 214 and mux 234. And, adder 282 is like adder 212 and adder 232.

Returning to the variable modulus operation of address accumulator 270, a desired modulus number is supplied to subtracter 286. INC register 284 is pre-loaded with a FastStepINC value. As adder 282 and register 272 accumulate a value in FastStepINC increments, subtracter 286 is evaluating the accumulated value to determine if it is larger than the value of modulus line 288. If the accumulated value is larger than the modulus value, carry out line 290 of subtracter 286 switches mux 280 to allow the value in subtracter 286 to be loaded into register 272. This switching essentially subtracts out the modulus value in register 272 clearing the five integer address bits, which is equivalent to a roll over. The value in register 272 can then begin to accumulate again. Therefore, the value on address line 274 is never larger than the modulus value and the halftone memory is address at the set modulus.

Note that the extra circuitry needed to implement variable modulus addressing may cause a timing delay which can be remedied by adding pipelined stages.

7.0 Linearity and Registration Controller

The purpose of the linearity and registration controller 78 is to feed back information to the phase resolution controller and the screen generator of the halftoner. The linearity and registration controller takes feedback information that is available, (from encoders, motion tracking systems, etc.), typically sent to mechanical components like a servo motor, and uses that information to performed registration correction electronically on both the image data and the screen being generated for that image data. This error information is given in addressability units of subscan precision, thereby facilitating very accurate compensation for linearity registration errors. Furthermore, the information supplied from the linearity and registration controller can be updated at various time intervals depending on the type of error being compensated.

Figure 35:
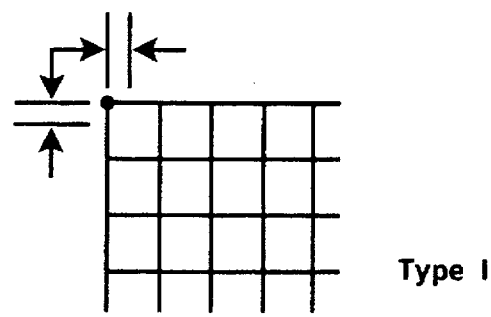
FIG. 35 is a graphical representation of four types of registration error.
Figure 35:
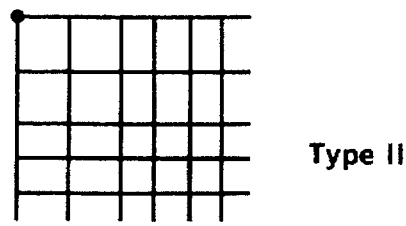
Figure 35:
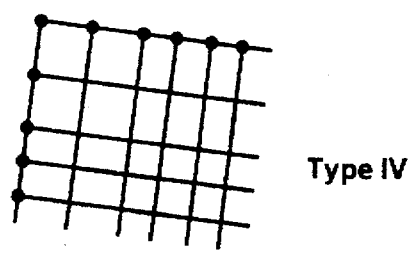
Figure 35:
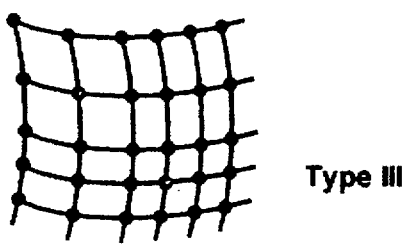

Referring to FIG. 35, shown are four types of registration errors which can be corrected electronically by the linearity and registration controller. Each registration type in increasing number includes the type or types of a lower number. For instance, Type II registration includes Type I, and Type III includes Type I and Type II. In the description of the four types of registration error, the term data refers to both the image data and its associated screen information.

Correction for Type I registration includes the ability to shift the data arbitrarily in two dimensions. This is required to achieve image edge registration and is useful in correcting for mechanical timing errors, start of scan errors and misregistration between different color layers. Correction for Type II adds the capability to speed up or slow down the data in two dimensions independently. This is required if the image rendering device, once registered at an edge, undergoes nonuniform velocity changes. Correction for Types III and IV registration allow the data to be skew compensated, for example, from photoreceptor belt skewing, or any registration error that repositions the pixels as a function of both the fast scan and slow scan position.

Without electronic registration feedback, the address accumulators of the phase/resolution controller would start from a START PHASE value of zero and accumulate a constant value in both the fastscan and slowscan directions as would the INC and FIRST registers of the address generators in the halftoner. With feedback, however, the START and FIRST values and/or the increment values, can be biased by adding in error values during scanning depending on the type of compensation needed. Therefore, it is important that the INC, START and FIRST registers be variable and have the ability to be updated periodically by the linearity and registration controller.

Figure 36:
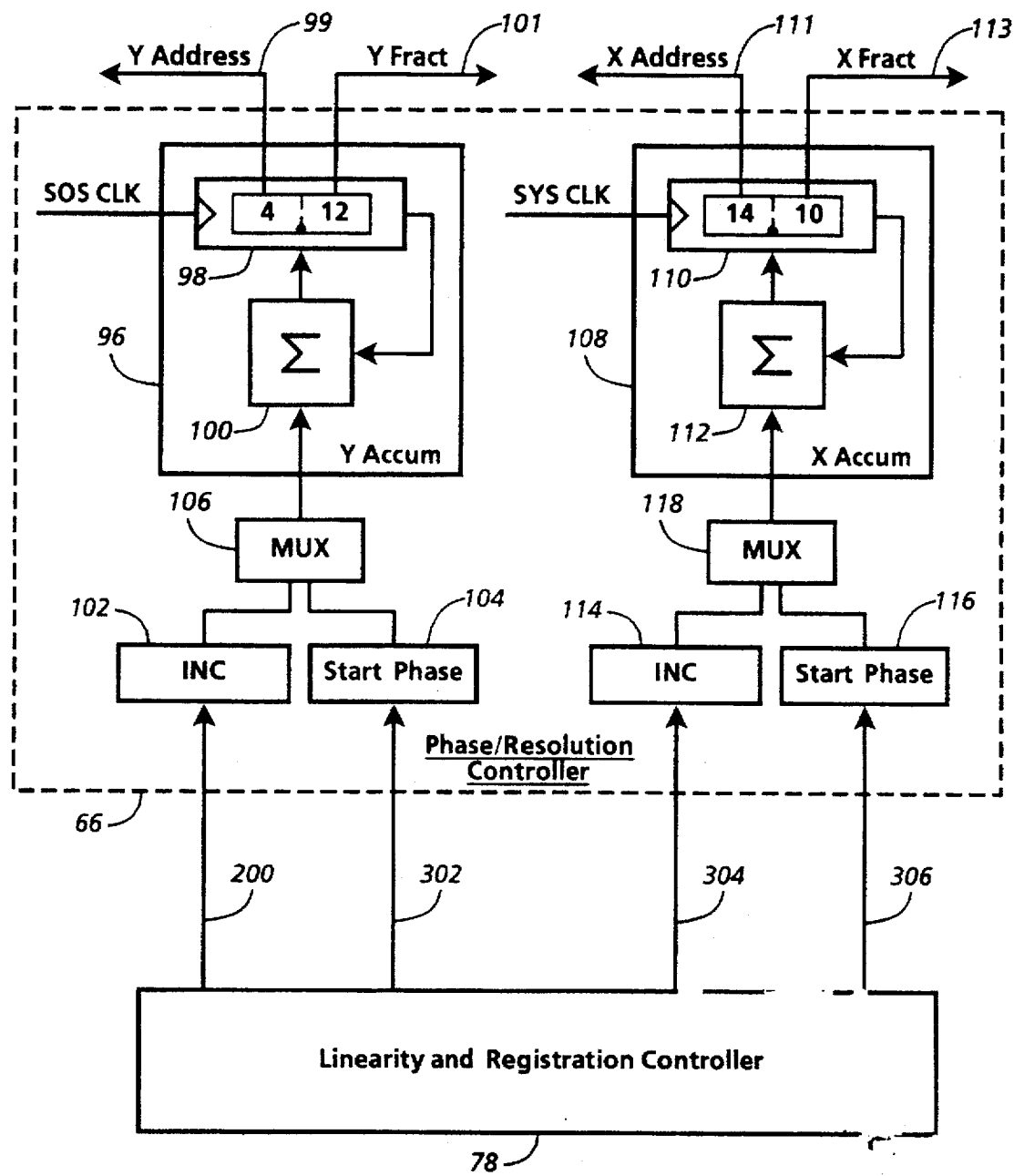
FIG. 36 is a block diagram depicting a relationship between the phase resolution controller and the linearity and registration controller.

Referring to FIGS. 36, shown is a block diagram depicting the relationship between phase resolution controller 66 and linearity and registration controller 78. In this case, linearity and registration controller 78 is calculating error compensation values for providing values to the INC and START PHASE registers. These values are passed to phase resolution controller 66 by updating the INC and START PHASE registers on a regular basis depending on the error being corrected. Error compensation values are being delivered from linearity and registration controller 78 to INC register 102 via line 300, START PHASE register 104 via line 302, INC register 114 via line 304 and START PHASE register 116 via line 306. As will be shown, different registers and combinations thereof are updated depending on which type of registration error is being corrected.

As fully described above with reference to sections 2.0 and 3.0, without electronic registration feedback, registers 102, 104, 114, and 116 are loaded as follows: START PHASE register 104 equals (ch)(D)(B)where ch is the channel number, D is the target data density in rasters per inch on the photoreceptor, and B is the beam spacing, in inches, between the photodiodes; INC register 102 equals the density (rasters/inch) times $V_o/\omega f$ in inches/facet (=rasters per facet); START PHASE register 116 equals zero assuming no error correction value has been supplied; and INC register 114 equals the number of samples per inch in the fastscan direction divided by the fastscan addressability (=samples per SYSCLK).

However, when compensating for registration errors, the values loaded into one or all of the above mentioned registers may be changed in the following way: START PHASE register 104 would equal (ch)(D)(B)+Yoffset, where ch is the channel number, D is the target data density in rasters per inch on the photoreceptor, and B is the beam spacing, in inches, between the photodiodes, and Yoffset is the amount of misregistration in the slowscan direction given in slowscan addressability units; INC register 102 equals the density (rasters/inch) times $V_o/\omega f$ in inches/facet±the rate of change of velocity in the slowscan direction; START PHASE register 116 equals Xoffset where Xoffset is the amount of misregistration in the fastscan direction given in fastscan addressability units; and INC register 114 equals the number of samples per inch in the fastscan direction divided by the fastscan addressability±the rate of change of velocity in the fastscan direction. It is important to note that the values supplied for compensation of registration errors are precise within subscan and sub pixel units. For instance, corrections could be done within 1/4800 of an inch in either the fastscan or slowscan direction.

Referring to FIGS. 35 and 36, for Type I registration compensation, linearity and registration controller 78 would supply corrected values to START PHASE register 104 and START PHASE register 116. Register 104 could be updated at the start of every page, or for multicolor printing, at the start of every color layer. Register 116 could be updated at the beginning of each scanline.

For Type II registration compensation, linearity and registration controller 78 would supply corrected values to INC register 102 as a function of fast scan position, and to INC register 114 as a function of slow scan position. These INC values may be updated at various intervals, or as needed, throughout the printing process.

For Type III and type IV registration compensation, linearity and registration controller 78 would supply corrected values to INC registers 102 and 114 and START PHASE registers 104 and 116 as a function of both fast scan and slow scan position. For type III registration compensation, the corrections may be calculated easily in real time with a counter,accumulator, or simple formula. For type IV correction, however, the corrections are nonlinear, and may require a look-up table for best results.

The actual operation of phase resolution controller 66 remains unchanged. However, with changes to the INC and START PHASE registers, the address to the FIFO, and the fraction values sent to the resampling interpolator are also changed. These changes are then used to render the correct image data for the registration error compensation.

As data from the interpolator is changed due to the compensation for registration errors, any halftone screen used on that data must also changed to accommodate that compensation. Basically, the halftone screen needs to be treated in the same way the data is treated for any given type of compensation.

Figure 37:
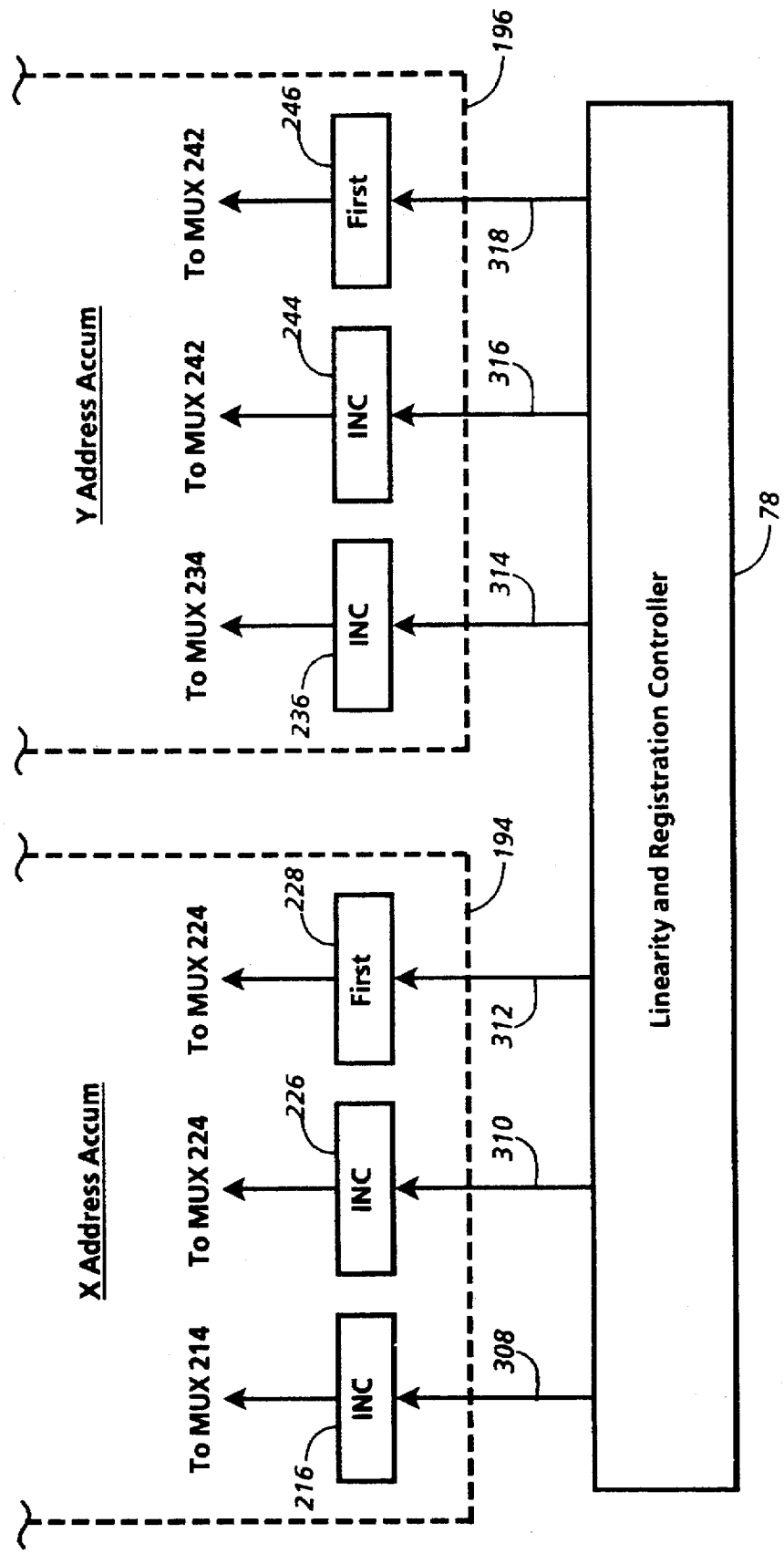
FIG. 37 is a block diagram depicting a relationship between the x address accumulator and y address accumulator of the halftoner and the linearity and registration controller.

Referring to FIG. 37, shown is a block diagram depicting the relationship between phase resolution controller 66 and the relevant registers of xaddress accumulator 194 and y address accumulator 196 or the halftoner. In this case, linearity and registration controller 78 is calculating error compensation values for providing corrected values to the INC and FIRST registers. These values are passed to phase resolution controller 66 by updating the INC and FIRST registers on a regular basis depending on the error being corrected. Error compensation values are being delivered from linearity and registration controller 78 to INC register 216 via line 308, INC register 226 via line 310, FIRST register 228 via line 312, INC register 236 via line 314, INC register 244 via line 316, and FIRST register 246 via line 318. As with the phase resolution controller, different registers and combinations thereof are updated depending on which type of registration error is being corrected.

As previously shown, the following are the assignments of variables to their respective registers: XFastStepINC is loaded into INC register 216; XSlowBoLINC is loaded into INC register 226; XSlowBoLFIRST is loaded into FIRST register 228; YFastStepINC is loaded into INC register 236; YSlowBoLINC is loaded into INC register 244; and YSlowBoLFIRST is loaded into FIRST register 246. However, for registration error compensation, the variables for these registers must also be changed For the fast scan direction, the XFastStepINC and YFastStepINC registers are normally loaded with information which has units of memory locations/SYSCLK. The error information from the preceding section has units of samples per SYSCLK. Therefore, by multiplying samples per SYSCLK by the known factor memory locations/sample, the error information will have the correct units to be processed as error information for the two X and Y Fast-StepINC registers.

Similarly, for the slow scan direction, the XSlowBoLINC, YSlowBoLINC, XSlowBoLFIRST, and YSlowBoLFIRST registers have units of memory locations per facet. The error information from the preceding section has units of rasters per facet. Therefore, by multiplying rasters per facet by the known factor memory locations/facet, the error information will have the correct units to be processed as error information for the four X and Y SlowBoL registers.

Figure 38:
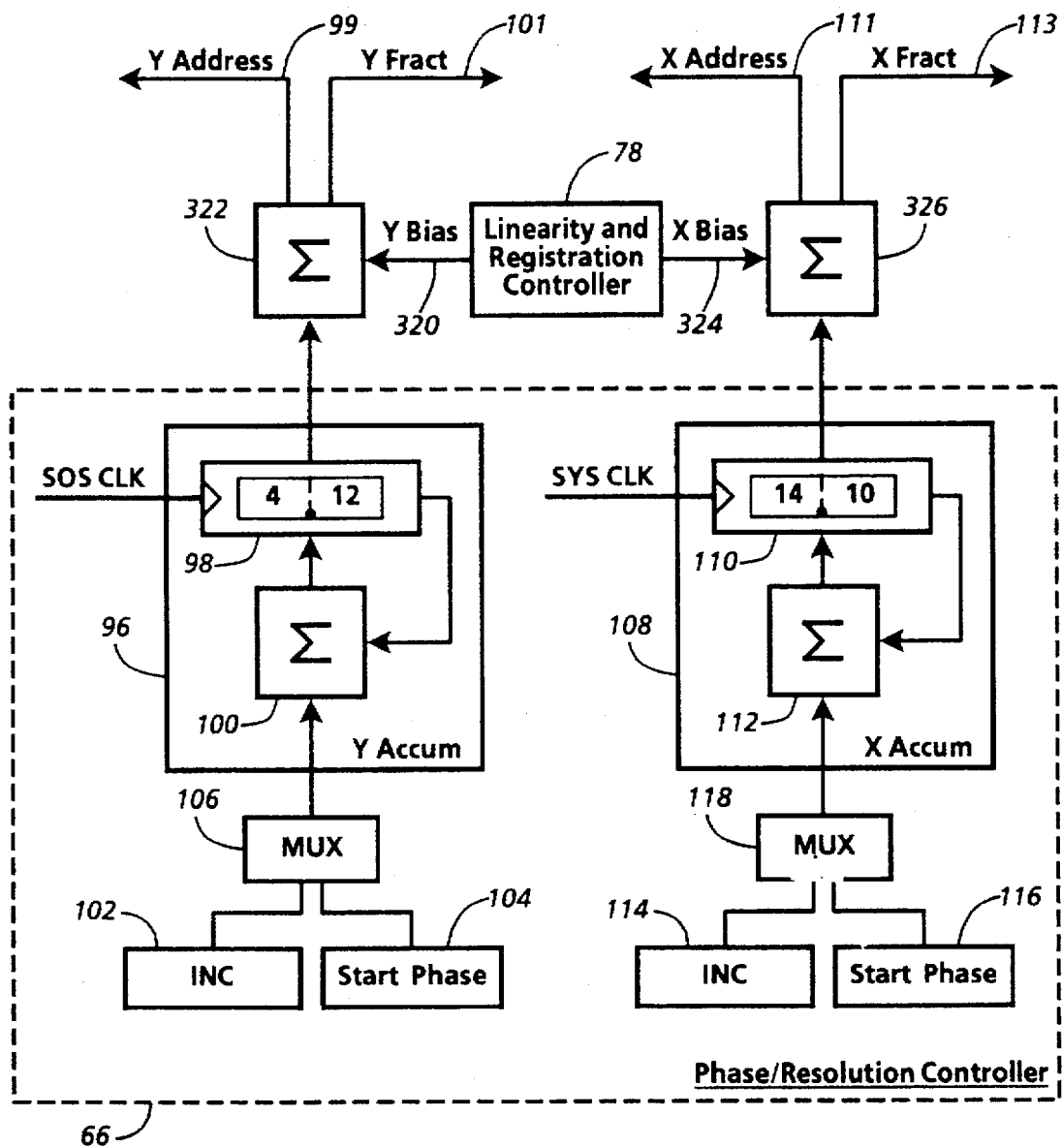
FIG. 38 is a block diagram depicting an alternate relationship between the phase resolution controller and the linearity and registration controller.

Referring to FIG. 38, shown is an alternate means of registration error correction to be used with phase resolution controller 66. In this embodiment, linearity and registration controller 78 provides an absolute correction ybias value, via line 320, to adder 322. The ybias value is added to the output of register 98 by adder 322, thus compensating for all errors in the slowscan direction. Adder 322 then supplies the YADDRESS 99 to the FIFO and the YFRACT 101 value to the interpolator. In a similar manner, linearity and registration controller 78 provides an absolute correction xbias value, via line 324, to adder 326. The xbias value is added to the output of register 110 by adder 326, thus compensating for all errors in the fastscan direction. Adder 326 then supplies the XADDRESS 111 to the FIFO and the XFRACT 113 value to the interpolator. Both the xbias and ybias values can be changed at anytime during printing, therefore allowing compensation for linearity and registration errors for the image data.

Figure 39:
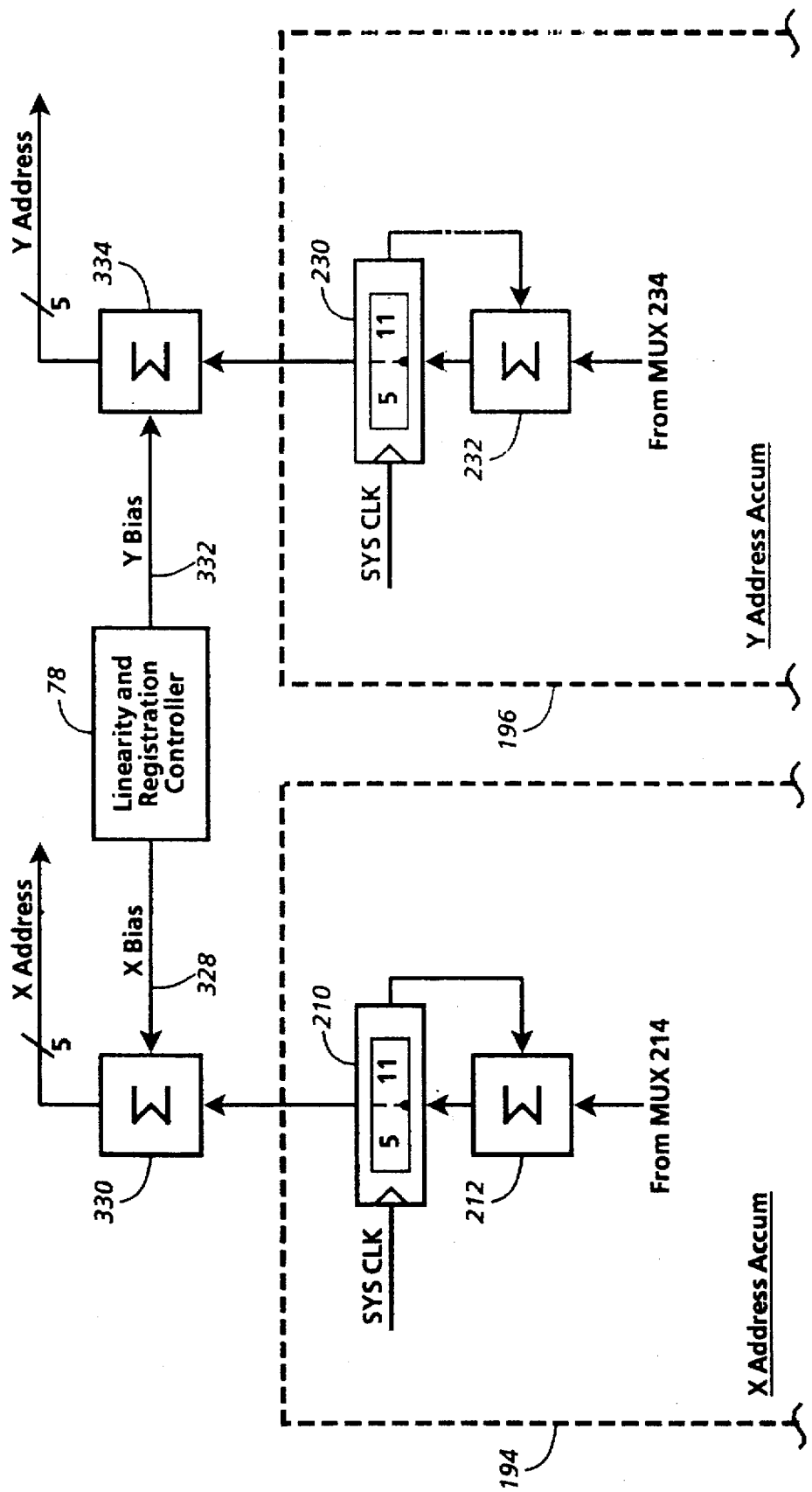
FIG. 39 is a block diagram depicting an alternate relationship between the x address accumulator and y address accumulator of the halftoner and the linearity and registration controller.

Referring to FIG. 39, shown is an alternate means of registration correction to be used with the address generation circuitry for the halftoner. In this embodiment, linearity and registration controller 78 provides an absolute correction xbias value, via line 328, to adder 330. The xbias value is added to the output of register 210 by adder 330, thus compensating for all errors in the x direction. Adder 330 then supplies the x address, XADDR, to the halftone memory. In a similar manner, linearity and registration controller 78 provides an absolute correction ybias value, via line 332, to adder 334. The ybias value is added to the output of register 230 by adder 334, thus compensating for all errors in the y direction. Adder 334 then supplies the y address, YADDR, the halftone memory. Both the xbias and ybias values can be changed at anytime during printing, therefore allowing compensation for linearity and registration errors for the screen data.

There are several ways that linearity and registration controller 78 can obtain information necessary to calculate error compensation values. For example, for page sync registration, a counter can be used to determine the number of addressability units in the process direction between the page sync signal and the start of scan signal, which indicates the subscan misregistration, and would be used to offset the slowscan start value. In the fastscan direction, sensors can track the edge of a photoreceptor belt with respect to the start of scan signal, again indicating the fastscan misregistration, and affecting the fastscan start value. These are both examples of Type I registration errors.

For the most general type of registration correction, type IV, PROM look up tables can be accessed during the scan to compensate for scanner optical non-linearity in the fastscan direction or process velocity non uniformity in the slowscan direction. These tables could be developed as part of a calibration routine.

In summary, all the error compensation values obtained are passed on in addressability units, and can be used to directly control the FIFO address, the calculation of resampled values in the interpolator, and the addresses for the screen generator.

In conclusion, the above disclosure described a system which provides a means for generating gray output data, where the gray output data used to drive a gray modulator for any type of writing engine which prints with binary output. For text, lineart and halftones, this system positions the edges of these features with a precision finer than the smallest resolution unit in both the slowscan and the fastscan directions, while rendering the best binary contrast possible.

While the invention has been described with reference to the structures disclosed, it is not confined to the details set forth, but is intended to cover such modifications or changes as may come within the scope of the following claims:

I claim:

1. A system for dynamically compensating for two dimensional registration errors in a printer with subscan precision, with the system converting an addressable image raster stored in memory into a light spot directed against a photoreceptor, the system comprising
   a mechanical component configured to provide feedback information,
   a registration controller configured to determine error compensation values based on feedback information from the mechanical component,
   a phase resolution controller configured to provide a fractional accumulated number for phase control, with the phase resolution controller connected to the registration controller to receive error compensation values and dynamically bias the fractional accumulated number based on the received error compensation values, and
   a resampling interpolator for determining two dimensional slope information, with the resampling interpolator connected to the phase resolution controller to receive the dynamically biased fractional accumulated number and adjust two dimensional slope information to cause arbitrary misalignment of the light spot to correct for errors in the mechanical component.

2. A system for dynamically compensating for two dimensional registration errors in a printer with subscan precision, with the system determining error compensation values based on feedback information from mechanical components, the system comprising
   a phase resolution controller having an X accumulator and a Y accumulator, with the X accumulator configured to provide a fractional accumulated number XFRACT, and a Y accumulator configured to provide a fractional accumulated number YFRACT, with the phase resolution controller receiving error compensation values and dynamically biasing the fractional accumulated numbers XFRACT and YFRACT based on received error compensation values, and
   a resampling interpolator for determining two dimensional slope information, with the resampling interpolator connected to the phase resolution controller to receive the dynamically biased fractional accumulated numbers XFRACT and YFRACT and adjust two dimensional slope information.

3. A system for dynamically compensating for two dimensional registration errors in a printer by adjusting position of a light spot with subscan precision, the system comprising
   a registration controller configured to determine error compensation values, a phase resolution controller configured to provide a fractional accumulated number for phase control, with the phase resolution controller connected to the registration controller to receive error compensation values and dynamically bias the fractional accumulated number based on the received error compensation values, and a resampling interpolator for determining two dimensional slope information, with the resampling interpolator connected to the phase resolution controller to receive the dynamically biased fractional accumulated number and adjust two dimensional slope information to compensate for registration errors.

* * * * *